(12) United States Patent
Yasunaga et al.

(10) Patent No.: US 11,067,739 B2
(45) Date of Patent: Jul. 20, 2021

(54) SURFACE LIGHT SOURCE DEVICE AND LIQUID CRYSTAL DISPLAY DEVICE

(71) Applicant: SHARP KABUSHIKI KAISHA, Sakai (JP)

(72) Inventors: Hirotoshi Yasunaga, Sakai (JP); Hisashi Watanabe, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 287 days.

(21) Appl. No.: 16/334,677

(22) PCT Filed: Sep. 19, 2017

(86) PCT No.: PCT/JP2017/033665
§ 371 (c)(1),
(2) Date: Mar. 19, 2019

(87) PCT Pub. No.: WO2018/056248
PCT Pub. Date: Mar. 29, 2018

(65) Prior Publication Data
US 2021/0141147 A1 May 13, 2021

(30) Foreign Application Priority Data
Sep. 20, 2016 (JP) .............................. JP2016-182775

(51) Int. Cl.
*F21V 8/00* (2006.01)
*G02B 6/00* (2006.01)

(52) U.S. Cl.
CPC .......... *G02B 6/0076* (2013.01); *G02B 6/0036* (2013.01); *G02B 6/0038* (2013.01); *G02B 6/0061* (2013.01); *G02B 6/0068* (2013.01)

(58) Field of Classification Search
CPC .. G02B 6/0076; G02B 6/0036; G02B 6/0038; G02B 6/0061; G02B 6/0068
See application file for complete search history.

(56) References Cited

U.S. PATENT DOCUMENTS 7,764,334 B2 * 7/2010 Kitagawa ............. G02B 6/0078
349/65
8,089,582 B2 * 1/2012 Sekiguchi ............ G02B 6/0078
349/65
(Continued)

FOREIGN PATENT DOCUMENTS

| CN | 102313203 A | 1/2012 |
|---|---|---|
| CN | 203656813 U | 6/2014 |
| JP | 2012-015111 A | 1/2012 |

*Primary Examiner* — Arman B Fallahkhair
(74) *Attorney, Agent, or Firm* — ScienBiziP, P.C.

(57) ABSTRACT

Provided are an edge-lit surface light source device and a liquid crystal display device, both of which are capable of two-dimensional local dimming without image contrast being reduced due to stray light. Even when light from LEDs that should be extracted by means of a light extraction pattern provided in a first section of a light guide plate is passed through the first section without being extracted, the light repeatedly strikes on a light absorbing layer formed in a second section, whereby much of the light is absorbed in the second section. Accordingly, little light from the LEDs is extracted from a third section, from which light from LEDs should originally be extracted, with the result that image contrast can be prevented from being reduced due to stray light. Moreover, the light absorbing layer has a front transmittance of as high as 95 to 99%, whereby, for example, much of the light that is extracted from the second section of another light guide plate is transmitted through the second section of the light guide plate to a display-surface side, and therefore, little light is influenced by the light absorbing layer.

21 Claims, 30 Drawing Sheets

(56) References Cited

U.S. PATENT DOCUMENTS

| | | | |
|---|---|---|---|
| 8,894,265 B2 * | 11/2014 | Chang | G02B 6/0068 362/616 |
| 10,408,991 B2 * | 9/2019 | Hsieh | G02B 6/0076 |
| 2012/0002444 A1 | 1/2012 | Kim et al. | |

* cited by examiner

FIG. 3
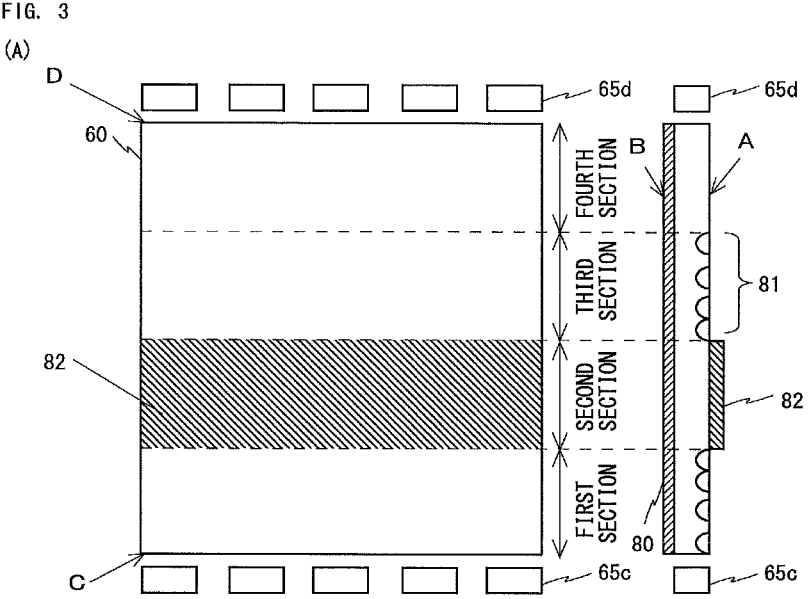
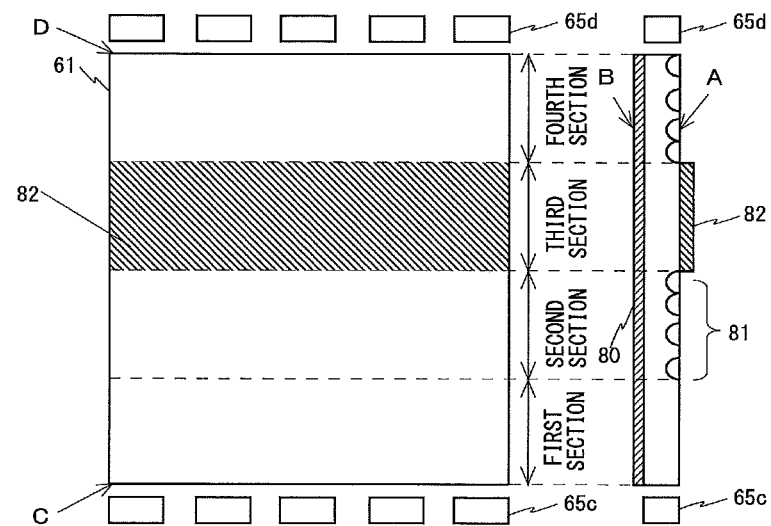

FIG. 5
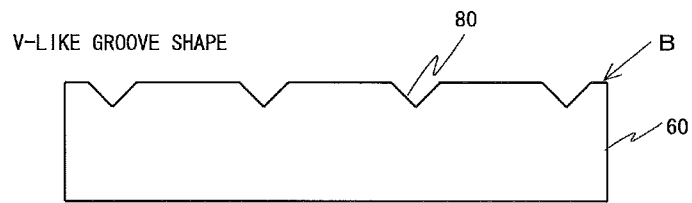
FIG. 6
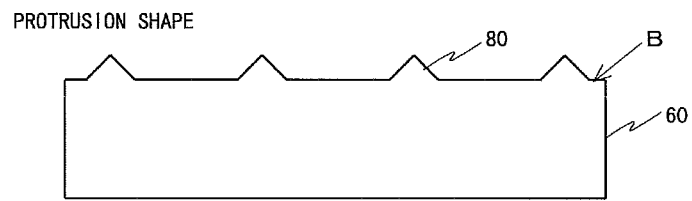
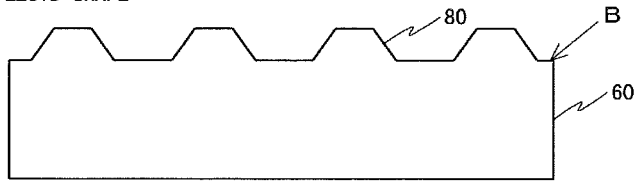
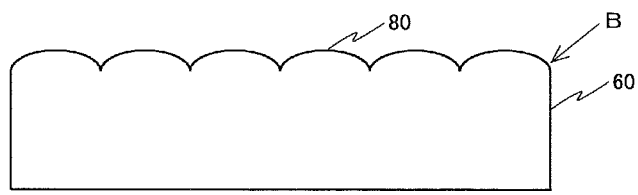

FIG. 17
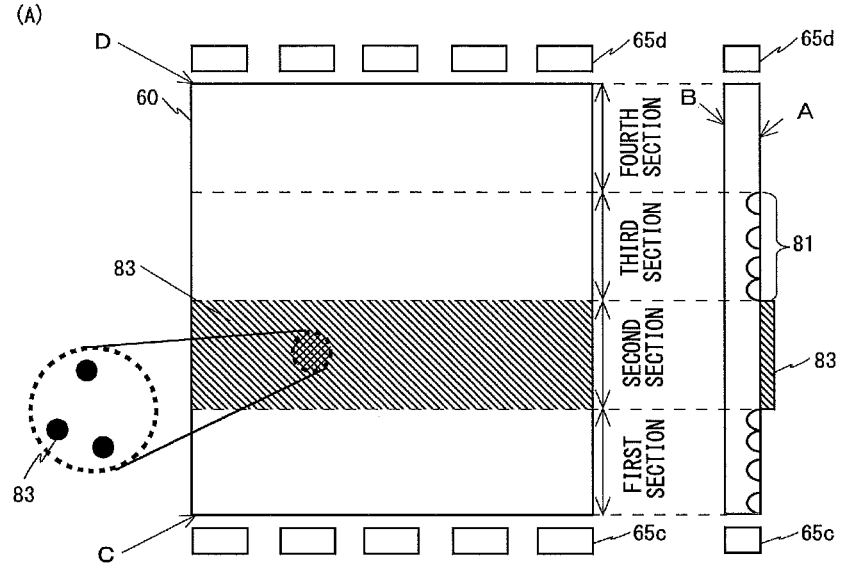
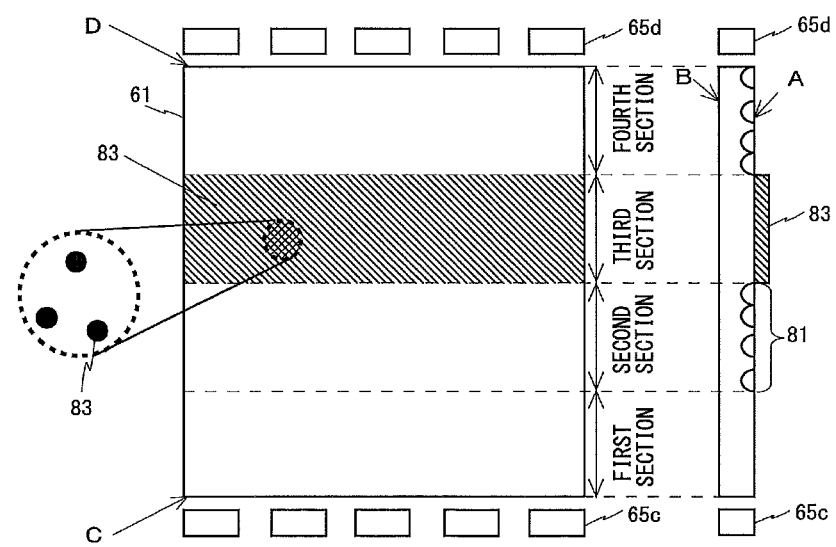

FIG. 18
(A)
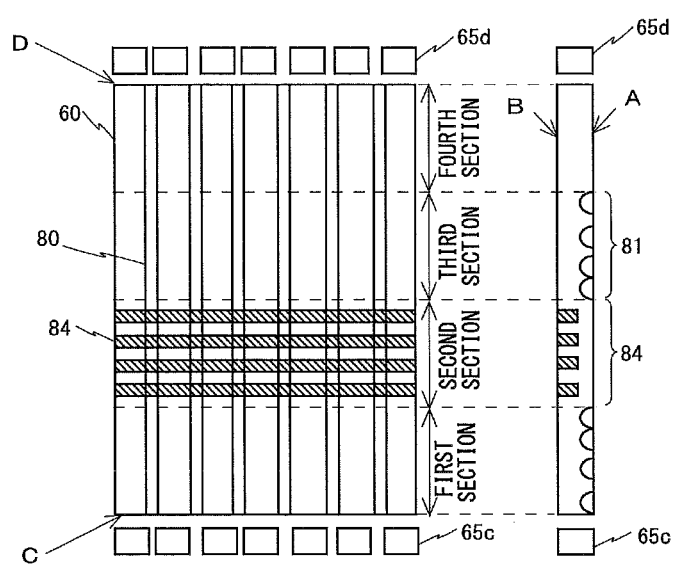
(B)
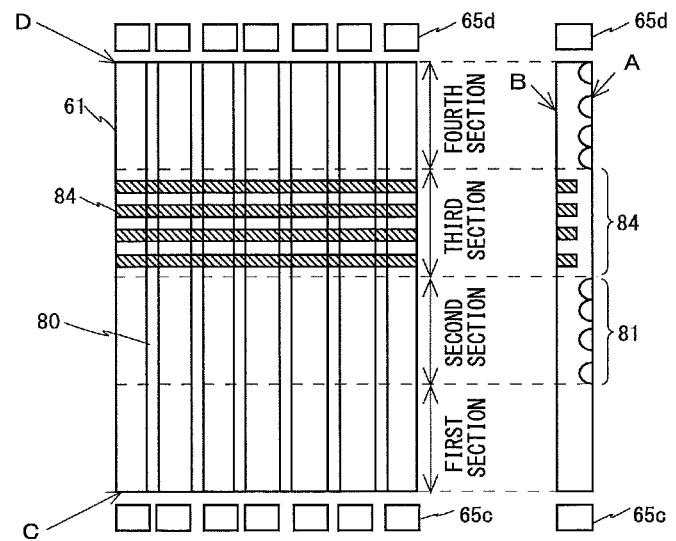

FIG. 24
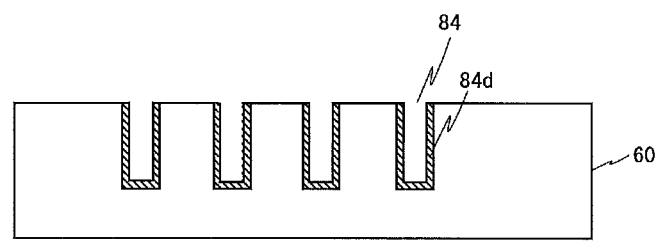
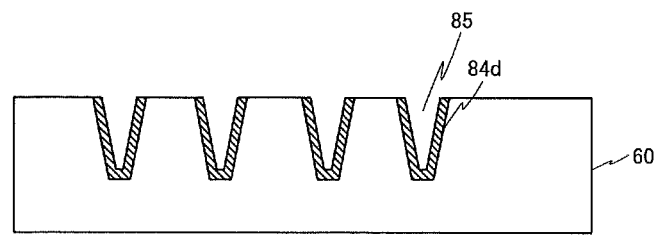

FIG. 25
(A)
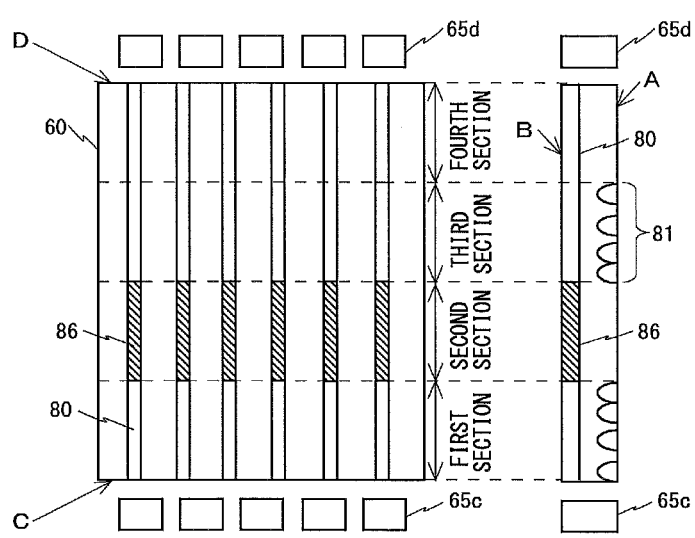
(B)
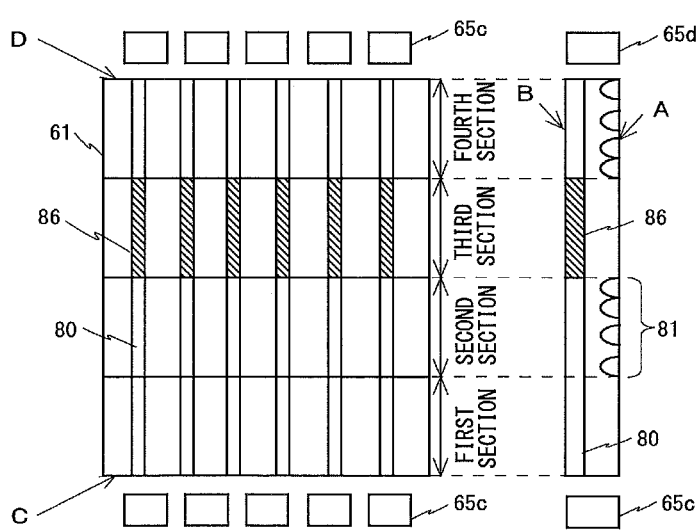

FIG. 28
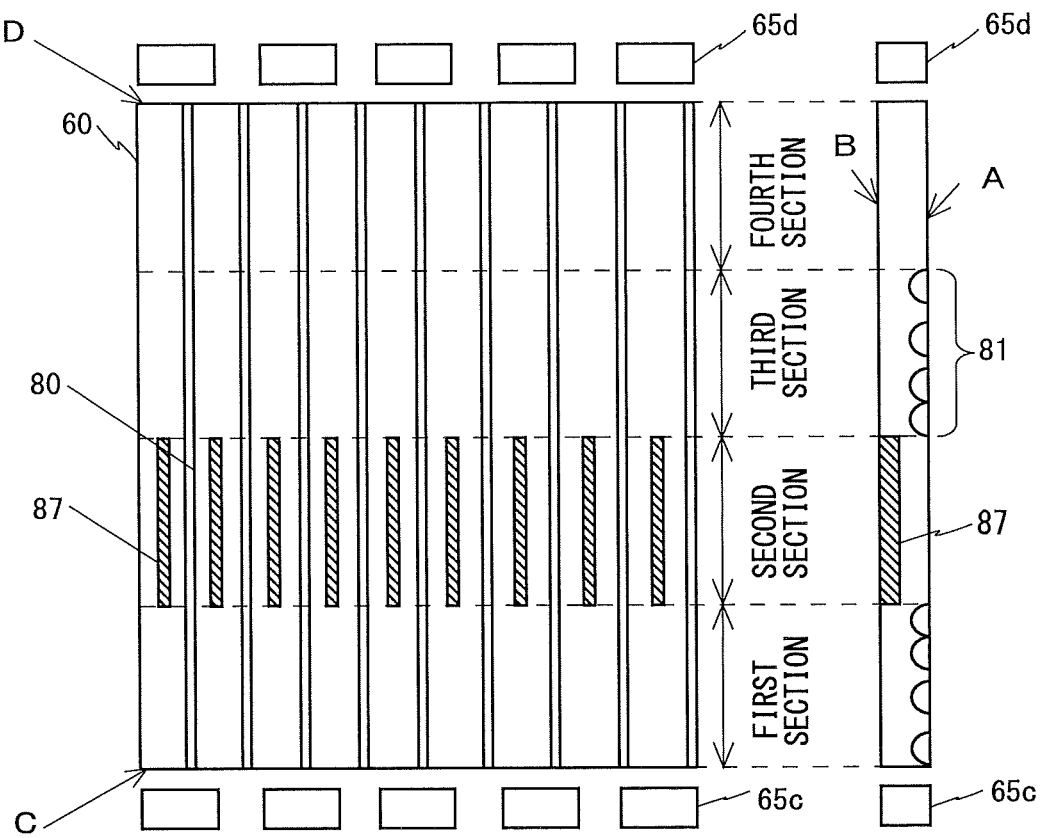
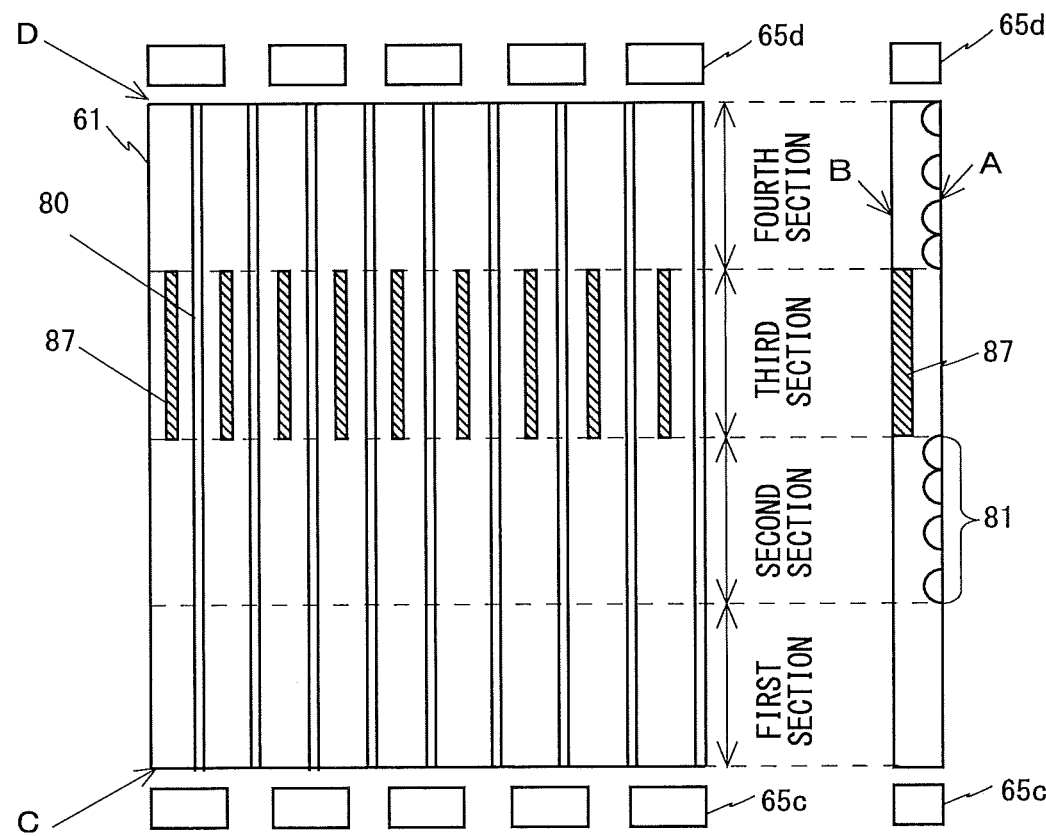

SURFACE LIGHT SOURCE DEVICE AND LIQUID CRYSTAL DISPLAY DEVICE

TECHNICAL FIELD

The present invention relates to surface light source devices and liquid crystal display devices, particularly to a surface light source device and a liquid crystal display device, both of which are capable of two-dimensional local dimming.

BACKGROUND ART

Displays are indispensable to electronic devices, such as televisions, personal computers, smartphones, and digital cameras. An important feature of a display provided in an electrical device is to be able to display a high-contrast image, and as a method for realizing such a feature, local dimming is performed.

In liquid crystal display devices used as displays of mobile terminals, edge-lit backlight units which use light guide plates are used as light sources for the purpose of thickness reduction. There is some demand for such mobile terminals to also realize local dimming, which allows high-contrast image display and reduced power consumption. For example, Patent Document 1 discloses an edge-lit backlight unit in which a plurality of light guide plates are stacked, and LEDs (light-emitting diodes), which can be individually adjusted in brightness, are disposed on opposite side surfaces of each light guide plate.

FIG. 31 is a cross-sectional view illustrating the configuration of the backlight unit 170 described in Patent Document 1, which is capable of two-dimensional local dimming. As shown in FIG. 31, the backlight unit 170 includes a stack of two light guide plates 160 and 161, and LEDs 165c and 165d respectively disposed on opposite side surfaces of each of the light guide plates 160 and 161. Each of the light guide plates 160 and 161 is divided into four sections in accordance with distances from the LEDs 165c and 165d, and some of the sections have light extraction patterns 181 provided therein. Such sections (light emission sections) with the light extraction patterns 181 are disposed so as not to overlap one another in the direction in which the light guide plates 160 and 161 are stacked. Accordingly, for example, light from the LEDs 165c that is incident on the light guide plate 161 is extracted from a light emission section 161A to the outside, and light from the LEDs 165d that is incident on the light guide plate 161 is extracted from a light emission section 161B to the outside.

CITATION LIST

Patent Document

Patent Document 1: Japanese Laid-Open Patent Publication No. 2012-15111

SUMMARY OF THE INVENTION

Problems to be Solved by the Invention

FIG. 32 is a diagram illustrating paths of light through the backlight unit 170 shown in FIG. 31. In the backlight unit 170 described in Patent Document 1, all light from the LEDs 165c is preferably extracted from the light emission section 161A, which is closest to the LEDs 165c, as shown in FIG. 32. However, some of the light that is incident on the light guide plate 161 is passed through the light emission section 161A and extracted from the light emission section 161B, from which light emitted by the LEDs 165d should originally be extracted. Similarly, all light from the LEDs 165d that is incident on the light guide plate 161 should be extracted from the light emission section 161B, which is closest to the LEDs 165d, but some of the light is passed through the light emission section 161B and extracted from the light emission section 161A, from which light emitted by the LEDs 165c should originally be extracted. In this manner, all light from each LED should be extracted from a light emission section closest to that LED, but some of the light is passed through the closest light emission section and extracted from a light emission section from which light emitted by other LEDs should be extracted. Light extracted from a light emission section from which the light should not be extracted becomes stray light, which might cause an image contrast reduction when local dimming is performed.

Therefore, an objective of the present invention is to provide an edge-lit surface light source device and a liquid crystal display device, both of which are capable of two-dimensional local dimming without image contrast being reduced due to stray light.

Solution to the Problems

A first aspect of the present invention is directed to a surface light source device including:

a plurality of stacked light guide plates, each having a pair of principal planes opposite to each other; and a plurality of first light emitters and a plurality of second light emitters, the first and second light emitters being disposed on respective pairs of opposite side surfaces of the light guide plates, wherein, each of the light guide plates is divided into a plurality of sections in a direction from a first side surface to a second side surface, the sections being parallel to the side surfaces, two nonadjacent sections of the sections provided for each of the light guide plates are light emission sections, each having light extraction patterns formed for reflecting incident light from the first or second light emitters so as to exit the light guide plate, the light emission sections of the light guide plates are disposed so as not to overlap one another in a stacking direction, and the light guide plates have light absorbers provided in sections between the light emission sections, the light absorbers absorbing light emitted by the first and second light emitters.

In a second aspect of the present invention, based on the first aspect of the present invention, wherein, the light guide plates include a stack of first and second light guide plates, each of the first and second light guide plates includes four sections divided in a direction from the first side surface to the second side surface such that of the four sections of each of the first and second light guide plates, two nonadjacent sections are the light emission sections disposed so as not to overlap the light emission sections of the other light guide plate in the stacking direction, and the light absorbers provided in the sections between the light emission sections of the light guide plates include a black pigment absorbing light emitted by the first and second light emitters.

In a third aspect of the present invention, based on the second aspect of the present invention, wherein the light absorber is a thin-film light absorbing layer including a black pigment and absorbing some incident light.

In a fourth aspect of the present invention, based on the third aspect of the present invention, wherein the light absorbing layer is a thin film having a front transmittance of 95 to 99%.

In a fifth aspect of the present invention, based on the second aspect of the present invention, wherein the light absorber includes a plurality of black pattern elements formed of a black pigment and absorbing some incident light.

In a sixth aspect of the present invention, based on the fifth aspect of the present invention, wherein the black pigment has an absorbance of 90 to 100%, and the light guide plate with the black pattern elements has a front transmittance of 95 to 99%.

In a seventh aspect of the present invention, based on the fifth aspect of the present invention, wherein the black pattern element has a maximum outer diameter of 0.1 mm or less.

In an eighth aspect of the present invention, based on the second aspect of the present invention, wherein the light absorber is provided on at least one principal plane of each of the first and second light guide plates.

In a ninth aspect of the present invention, based on the second aspect of the present invention, wherein the light guide plate has a plurality of prisms formed across the first principal plane so as to extend from the first side surface to the second side surface.

In a tenth aspect of the present invention, based on the second aspect of the present invention, wherein the light guide plate is divided into a plurality of subareas between prism areas, each prism area consisting of a plurality of prisms extending across the first principal plain from the first side surface to the second side surface.

In an eleventh aspect of the present invention, based on the ninth or tenth aspect of the present invention, wherein the light absorber includes a plurality of light absorbing grooves extending in a direction perpendicular to the prisms formed across the light guide plate, each light absorbing groove containing the black pigment.

In a twelfth aspect of the present invention, based on the ninth or tenth aspect of the present invention, wherein the light absorber includes light absorbing grooves formed between and directed parallel to the prisms formed across the light guide plate, the light absorbing grooves containing the black pigment.

In a thirteenth aspect of the present invention, based on the eleventh or twelfth aspect of the present invention, wherein, the black pigment contained in the light absorbing groove has an absorbance of 90 to 100%, and the light guide plate with the light absorbing grooves has a front transmittance of 95 to 99%.

In a fourteenth aspect of the present invention, based on the eleventh or twelfth aspect of the present invention, wherein the black pigment is embedded in the light absorbing groove.

In a fifteenth aspect of the present invention, based on the eleventh or twelfth aspect of the present invention, wherein the black pigment is applied to side surfaces of the light absorbing groove.

In a sixteenth aspect of the present invention, based on the eleventh or twelfth aspect of the present invention, wherein the light absorbing groove is a slit-like groove or a trapezoidal groove.

In a seventeenth aspect of the present invention, based on the ninth or tenth aspect of the present invention, wherein the light absorber includes a portion of each of the prisms formed across a surface of the light guide plate, the portion being provided in a section between the light emission sections and containing the black pigment.

In an eighteenth aspect of the present invention, based on the seventeenth aspect of the present invention, wherein the light guide plate with the prisms containing the black pigment has a front transmittance of 95 to 99%.

In a nineteenth aspect of the present invention, based on the second aspect of the present invention, wherein the light extraction pattern is formed in the light emission section so as to monotonically increase in density from a side of the closer of the first and second light emitters toward a center portion.

In a twentieth aspect of the present invention, based on the second aspect of the present invention, further comprising a light emitter lighting circuit configured to allow the first light emitters and the second light emitters to emit light with luminances obtained based on externally provided luminance data, wherein the first light emitters and the second light emitters are connected in parallel and to the light emitter lighting circuit.

A twenty first aspect of the present invention is directed to a liquid crystal display device including a surface light source device of any one of the first aspect through twenties aspect.

Effect of the Invention

In the first aspect of the invention, the light absorbers for absorbing light emitted by the first and second light emitters are provided in the sections between the light emission sections of the light guide plates. Light from each light emitter is extracted from the light emission section closest to that light emitter, but some light travels through the light emission section without being extracted, and much of such light is absorbed by the light absorber, with the result that little light is extracted from the light emission section that extracts light from the other light emitter. In this manner, light can be prevented from being extracted from the light emission section from which the light should originally not be extracted and thereby becoming stray light, with the result that high-contrast image display can be achieved when local dimming is performed.

In the second aspect of the invention, the light absorbers formed in the sections between the light emission sections of the first and second light guide plates include a black pigment that absorbs light emitted by the first and second light emitters, at the same ratio, and therefore, absorbs much of the light from the light emitters that is passed through the light emission sections closest to the respective light emitters. Thus, the amount of stray light is significantly reduced, with the result that high-contrast image display can be achieved when local dimming is performed.

In the third aspect of the invention, the light absorber is a thin-film light absorbing layer including a black pigment and absorbing some incident light. Thus, light passed through the light emission section from which the light should originally be extracted is absorbed by experiencing transmission a number of times, with the result that stray light can be inhibited from occurring.

In the fourth aspect of the invention, the light absorbing layer is a thin-film light absorbing layer having a front transmittance of 95 to 99%, and therefore, when light extracted from another light guide plate is transmitted through the light absorbing layer on a path that leads the light to the outside, much of the light is transmitted through the light absorbing layer without being absorbed. Thus, the surface light source device can perform local dimming with almost no reduction of the extracted light in luminance.

In the fifth aspect of the invention, the light absorber includes a plurality of black pattern elements made of a black pigment, and therefore, when light passed through the light emission section from which the light should originally be extracted strikes on the light absorber once, the light is almost certainly absorbed, with the result that stray light can be inhibited from occurring.

In the sixth aspect of the invention, the front transmittance of the light guide plates with the black pattern elements is 95 to 99%, and therefore, when light extracted from one light guide plate is transmitted through the surface of another light guide plate with the black pattern elements on a path that leads the light to the outside, much of the light is transmitted without being absorbed. Thus, the surface light source device can perform local dimming with almost no reduction of the extracted light in luminance.

In the seventh aspect of the invention, the maximum outer diameter of the black pattern element is 0.1 mm or less, whereby even when light emitted by the surface light source device backlights a display panel, the viewer does not see any black pattern elements. Thus, it is rendered possible to appreciate high-contrast images without noticing the black pattern elements.

In the eighth aspect of the invention, the light absorber is provided on at least one principal plane of each light guide plate, with the result that stray light can be inhibited from occurring. Thus, high-contrast image display can be achieved when local dimming is performed.

In the ninth aspect of the invention, each light guide plate includes a plurality of prisms formed so as to extend from one side surface to another side surface, and therefore, light emitted by the first or second light emitters hits the prisms so as to be able to travel forward without deviating to the left and right.

In the tenth aspect of the invention, each light guide plate includes a plurality of subareas by the prism areas, and therefore, light emitted by the first or second light emitters can travel forward without going out of the subareas.

In the eleventh aspect of the invention, the light absorber includes a plurality of light absorbing grooves extending in a direction perpendicular to the prisms. Accordingly, light passed through the light emission section from which the light should originally be extracted is absorbed, with the result that stray light is inhibited from occurring. Thus, high-contrast image display can be achieved when local dimming is performed.

In the twelfth aspect of the invention, the light absorber includes light absorbing grooves formed between and directed parallel to the prisms. Accordingly, light passed through the light emission section from which the light should originally be extracted is absorbed, with the result that stray light is inhibited from occurring. Thus, high-contrast image display can be achieved when local dimming is performed.

In the thirteenth aspect of the invention, the light absorbing groove contains a black pigment having an absorbance of 90 to 100%, and therefore, when light passed through the light emission section from which the light should originally be extracted strikes on the light absorber once, the light is almost certainly absorbed, with the result that stray light can be inhibited from occurring. Moreover, the front transmittance of the light guide plates with the black pattern elements is 95 to 99%, and therefore, when light extracted from another light guide plate is transmitted through the light absorbing groove on a path that leads the light to the outside, much of the light is transmitted without being absorbed. Thus, the surface light source device can perform local dimming with almost no reduction of the extracted light in luminance.

In the fourteenth aspect of the invention, the light absorbing groove with the black pigment embedded therein absorbs incident light, with the result that high-contrast image display can be achieved when local dimming is performed. Moreover, the embedding of the black pigment is easier than other methods such as application, and therefore, production cost can be reduced.

In the fifteenth aspect of the invention, the light absorbing groove with the black pigment applied to the side surfaces absorbs incident light as does the light absorbing groove with the embedded black pigment, with the result that high-contrast image display can be achieved when local dimming is performed.

In the sixteenth aspect of the invention, the light absorbing groove is provided in the form of a slit, and in this case, the light absorbing groove has a high absorbance for incident light through the same light guide plate and a reduced total cross-sectional area ratio, resulting in a high transmittance for incident light through a different light guide plate. Thus, high-contrast image display can be achieved when local dimming is performed. Moreover, in the case where the light absorbing groove is provided in the form of a trapezoidal groove, the light absorbing groove has a high absorbance for incident light through the same light guide plate, with the result that high-contrast image display can be achieved. Moreover, the light absorbing groove has a wide opening area and therefore can be readily formed.

In the seventeenth aspect of the invention, portions of the prisms formed across the surfaces of the light guide plates are used as light absorbing grooves, resulting in a shortened process of producing the light absorbing grooves. Thus, the cost of producing the light guide plates can be reduced.

In the eighteenth aspect of the invention, the front transmittance of the light guide plates with the prisms including a black pigment is 95 to 99%, and therefore, when light extracted from one light guide plate is transmitted through the surface of another light guide plate with the prisms on a path that leads the light to the outside, much of the light is transmitted without being absorbed. Thus, the surface light source device can perform local dimming with almost no reduction of the extracted light in luminance.

In the nineteenth aspect of the invention, the light extraction patterns are formed such that the density thereof increases from opposite side surfaces of the light guide plate toward the center portion. Accordingly, incident light from the first light emitters disposed on one of the side surfaces of the light guide plate is emitted with a uniform luminance from an area extending from that side surface to the center portion. Incident light from the second light emitters disposed on the other side surface is emitted with a uniform luminance from an area extending from that side surface to the center portion. Thus, two-dimensional local dimming can be performed with higher-contrast image display.

In the twentieth aspect of the invention, the first and second light emitters are connected in parallel and to the light emitter lighting circuit, and therefore, the first light and second light emitters can be adjusted in light emission intensity independently of each other.

In the twenty-first aspect of the invention, the display device including a surface light source device of any of the first through twentieth aspects can achieve high-contrast image display and reduced power consumption when local dimming is performed.

BRIEF DESCRIPTION OF THE DRAWINGS

FIG. 3 provides plan views and cross-sectional views illustrating two light guide plates included in the backlight unit shown in FIG. 2; more specifically, part (A) provides a plan view and a cross-sectional view of one light guide plate, and part (B) provides a plan view and a cross-sectional view of the other light guide plate.

FIG. 5 is a cross-sectional view of prisms formed in the shape of V-like grooves across a B-plane of the light guide plate included in the backlight unit shown in FIG. 2.

FIG. 6 provides diagrams illustrating prisms formed in various shapes across B-planes of light guide plates as included in the backlight unit shown in FIG. 2.

FIG. 17 provides plan views and cross-sectional views illustrating the configuration of a backlight unit according to a second embodiment of the present invention; more specifically, part (A) provides a plan view and a cross-sectional view of one light guide plate, and part (B) provides a plan view and a cross-sectional view of the other light guide plate.

FIG. 18 provides plan views and cross-sectional views illustrating the configuration of a backlight unit according to a third embodiment of the present invention; more specifically, part (A) provides a plan view and a cross-sectional view of one light guide plate, and part (B) provides a plan view and a cross-sectional view of the other light guide plate.

FIG. 24 is a diagram of the backlight units according to the variants of the third embodiment where a black pigment is applied to slits or trapezoidal grooves so as to cover side surfaces thereof.

FIG. 25 provides plan views and cross-sectional views illustrating the configuration of a backlight unit according to a fourth embodiment of the present invention; more specifically, part (A) provides a plan view and a cross-sectional view of one light guide plate, and part (B) provides a plan view and a cross-sectional view of the other light guide plate.

FIG. 28 provides plan views and cross-sectional views illustrating the configuration of a backlight unit according to a variant of the fourth embodiment; more specifically, part (A) provides a plan view and a cross-sectional view of one light guide plate, and part (B) provides a plan view and a cross-sectional view of the other light guide plate.

MODES FOR CARRYING OUT THE INVENTION

1. First Embodiment

Figure 1:
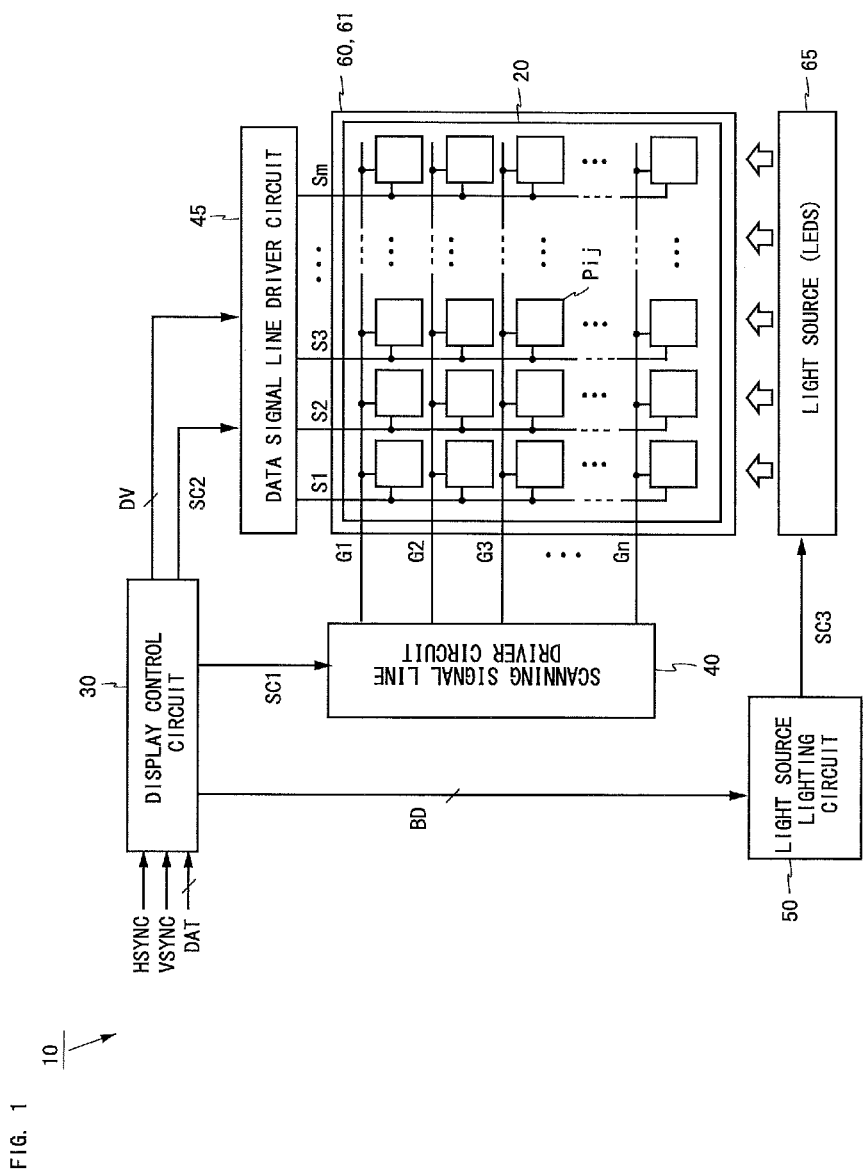
FIG. 1 is a block diagram illustrating the configuration of a liquid crystal display device including a backlight unit according to a first embodiment of the present invention.

<1.1 Configuration and Operation of the Display Device>
FIG. 1 is a block diagram illustrating the configuration of a liquid crystal display device 10 including a backlight unit according to a first embodiment of the present invention. As shown in FIG. 1, the liquid crystal display device 10 includes a liquid crystal panel 20, a display control circuit 30, a scanning signal line driver circuit 40, a data signal line driver circuit 45, a light source lighting circuit 50, two light guide plates 60 and 61, and a light source 65. The light guide plates 60 and 61 are stacked on a back surface of the liquid crystal panel 20, and the light source 65 includes LEDs disposed on opposite side surfaces of the light guide plates 60 and 61. Note that the light source 65 and the light guide plate 60 will also be collectively referred to as the "backlight unit" or the "surface light source device", the LEDs included in the light source 65 will also be referred to as the "light emitters", and the light source lighting circuit 50 will also be referred to as the "light emitter lighting circuit". Moreover, an optical sheet, a polarizing plate, a reflective sheet, and other elements are disposed so as to sandwich the light guide plates 60 and 61, but any illustrations thereof are omitted.

The liquid crystal panel 20 includes n scanning signal lines $G_1$ to $G_n$, m data signal lines $S_1$ to $S_m$, and (m×n) pixels $P_{ij}$ (m and n: integers of 2 or more, i: an integer of from 1 to n, j: an integer of from 1 to m). The scanning signal lines $G_1$ to $G_n$ are disposed parallel to each other, and the data signal lines $S_1$ to $S_m$ are disposed parallel to each other so as to cross the scanning signal lines $G_1$ to $G_n$. The pixel $P_{ij}$ is disposed near an intersection of the i'th scanning signal line $G_i$ and the j'th data signal line $S_j$. In this manner, the (m×n) pixels $P_{ij}$ are disposed in a matrix with m pixels in each row and n pixels in each column. The scanning signal line $G_i$ is connected in common to the pixels $P_{ij}$ disposed in the i'th row, and the data signal line $S_j$ is connected in common to the pixels $P_{ij}$ disposed in the j'th column.

From outside the liquid crystal display device 10, the display control circuit 30 is supplied with control signals, such as a horizontal synchronization signal HSYNC and a vertical synchronization signal VSYNC, and an image signal DAT. On the basis of these signals, the display control circuit 30 generates a control signal SC1, a control signal SC2, digital image data DV, and luminance data BD, and outputs the control signal SC1 to the scanning signal line driver circuit 40 and the control signal SC2 and the digital image data DV to the data signal line driver circuit 45. Moreover, the display control circuit 30 obtains luminance data BD based on the image signal DAT and outputs the luminance data BD to the light source lighting circuit 50 in order to cause the LEDs included in the light source 65 to emit light with individually adjusted light emission intensities.

In accordance with the control signal SC1, the scanning signal line driver circuit 40 provides high-level output signals sequentially to the scanning signal lines $G_1$ to $G_n$ one by one. Accordingly, the scanning signal lines $G_1$ to $G_n$ are sequentially selected one by one, thereby collectively selecting the pixels $P_{ij}$ in one row at a time. In accordance with the control signal SC2 and the digital image data DV, the data signal line driver circuit 45 provides signal voltages corresponding to the digital image data DV to the data signal lines $S_1$ to $S_m$. As a result, the signal voltages corresponding to the digital image data DV are written to the selected pixels $P_{ij}$ in one row.

In accordance with the luminance data BD provided by the display control circuit 30, the light source lighting circuit 50 causes the LEDs included in the light source 65 to emit light. The light emitted by the LEDs is incident on the light guide plates 60 and 61, and travels through the light guide plates 60 and 61 while experiencing total reflection before being directed toward the liquid crystal panel 20 by being reflected by light extraction patterns (not shown) formed on back surfaces of the light guide plates 60 and 61. In this manner, the light from the LEDs is transmitted through the pixels in which the signal voltages corresponding to the digital image data DV are being written, with the result the liquid crystal panel 20 displays an image.

<1.2 Configuration of the Backlight Unit>

Figure 2:
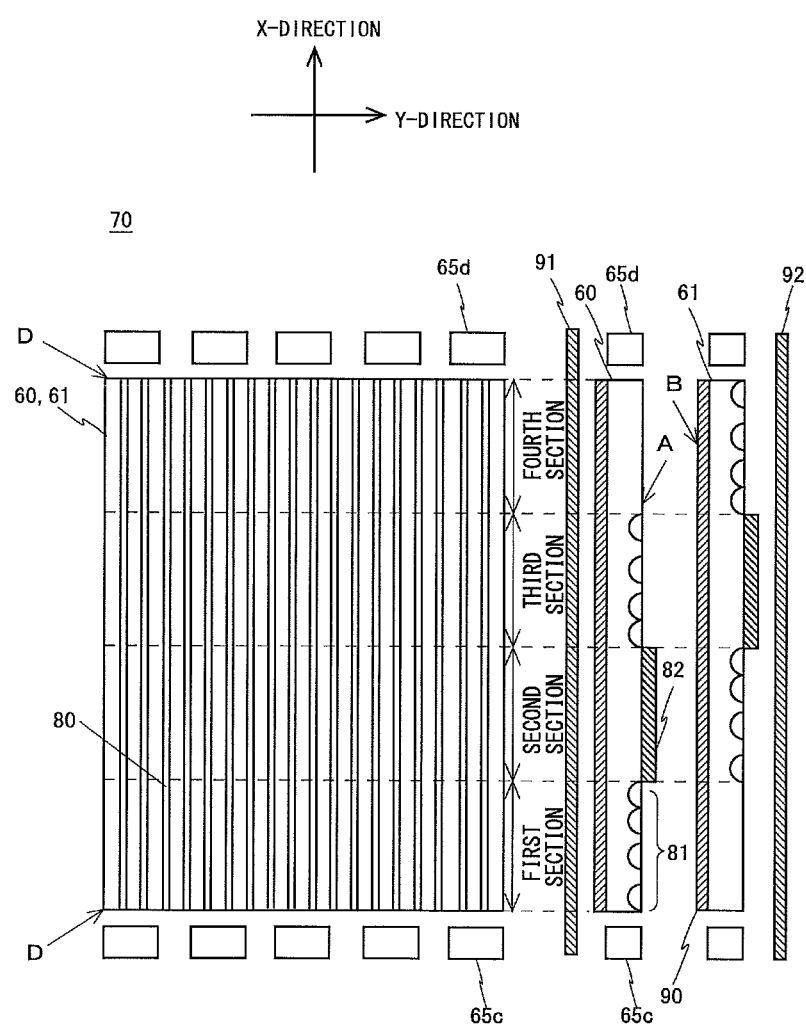
FIG. 2 provides a plan view and a cross-sectional view illustrating the configuration of the backlight unit according to the first embodiment shown in FIG. 1.

FIG. 2 provides a plan view and a cross-sectional view illustrating the backlight unit 70 according to the first embodiment. In FIG. 2, the "X-direction" represents a direction from the bottom to the top of the figure, and the "Y-direction" represents a direction from the left to the right of the figure. The "X-direction" and the "Y-direction" also represent the same directions as the above in other figures for the specification.

As shown in FIG. 2, the two stacked light guide plates 60 and 61 are rectangular plates, each having principal planes positioned opposite to each other, and the light guide plate 60 is stacked on the light guide plate 61. Each of the light guide plates 60 and 61 has a plurality of prisms 80 formed entirely across a first principal plane (a display surface-side principal plane, referred to below as a "B-plane") in the X-direction, from one side surface (a lower side surface in FIG. 2, referred to below as a "C-plane") to an opposite side surface (an upper side surface in FIG. 2, referred to below as a "D-plane"). For example, prism width is 5 μm, and prism pitch is 40 μm. The light guide plates 60 and 61 have pluralities of LEDs 65c and 65d respectively disposed on the C- and D-planes. Note that the shape of the light guide plates is not limited to a rectangle, and the light guide plates may be shaped so as to be applicable to a free-form display.

Each of the light guide plates 60 and 61 is divided into four sections, and in two of the sections, the light guide plates 60 and 61 have the light extraction patterns 81 formed on second principal planes (back surface-side principal planes, referred to below as "A-planes") in order to extract light from the light guide plates 60 and 61. The four sections will be described in detail later. Moreover, there are provided an optical sheet 91 and a reflective sheet 92 sandwiching the two light guide plates 60 and 61, and these sheets will also be described in detail later.

FIG. 3 provides plan views and cross-sectional views illustrating the two light guide plates 60 and 61 included in the backlight unit 70 shown in FIG. 2; more specifically, FIG. 3(A) provides a plan view and a cross-sectional view of the light guide plate 60, and FIG. 3(B) provides a plan view and a cross-sectional view of the light guide plate 61. Note that in FIGS. 3(A) and 3(B), the prisms formed across the B-planes are omitted. As shown in FIGS. 3(A) and 3(B), each of the light guide plates 60 and 61 is divided into four sections, which will be referred to as, from the side closest to the LEDs 65c, first to fourth sections.

The light extraction patterns 81 are formed on the A-plane of the light guide plate 60 in the first and third sections and on the A-plane of the light guide plate 61 in the second and fourth sections. The light extraction patterns 81 formed on the light guide plates 60 and 61 are disposed so as not to overlap each other in the direction in which these two light guide plates 60 and 61 are stacked, and, for example, when light traveling through the light guide plate 60 is incident on any light extraction pattern 81, the light extraction pattern 81 functions to reflect the light to the outside of the light guide plate 60.

Figure 4:
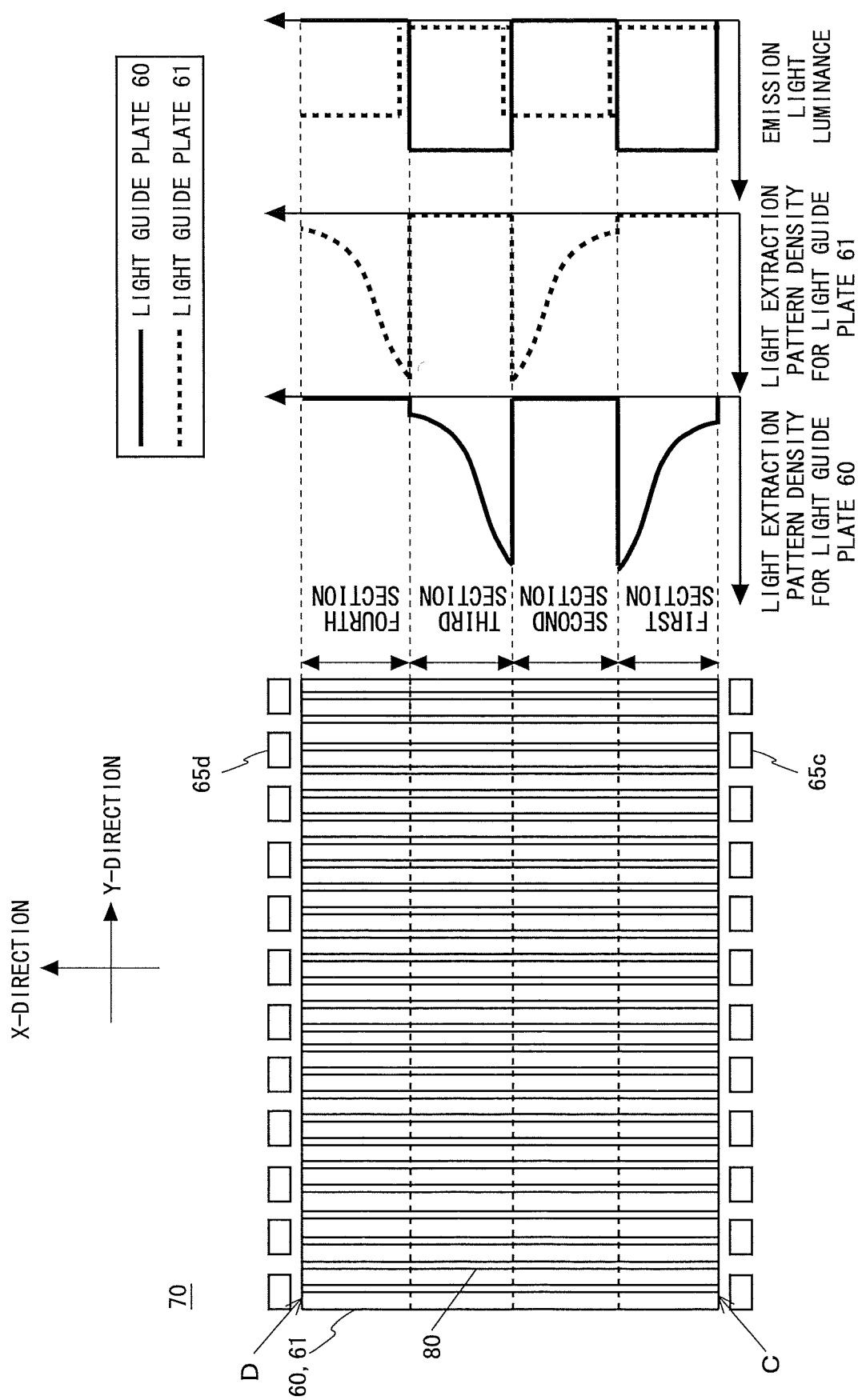
FIG. 4 is a diagram showing densities of light extraction patterns formed in sections of the two light guide plates shown in FIG. 3, along with emission light luminance.

FIG. 4 is a diagram showing densities of the light extraction patterns formed in the sections of the light guide plates 60 and 61, along with emission light luminance. As shown in FIG. 4, the density of the light extraction pattern formed in the first section of the light guide plate 60 is the lowest on a side closest to the LEDs 65c and increases toward a center portion of the light guide plate. The density of the light extraction pattern formed in the third section is the lowest on a side closest to the LEDs 65d and increases toward the center portion. There are no light extraction patterns formed in the second and fourth sections.

The density of the light extraction pattern formed in the second section of the light guide plate 61 is the lowest on a side closest to the LEDs 65c and increases toward a center portion of the light guide plate. The density of the light extraction pattern formed in the fourth section is the lowest on a side closest to the LEDs 65d and increases toward the center portion. There are no light extraction patterns formed in the first and third sections.

Incident light from the LEDs 65c disposed on the C-plane of the light guide plate 60 hits the prisms 80 formed across the B-plane and thereby travels straight in a direction from the C-plane toward the D-plane without deviating to the left and right, with the result that the light is extracted from the light guide plate 60 by means of the light extraction pattern formed in the first section. On the other hand, as for incident light from the LEDs 65d disposed on the D-plane, the prisms 80 cause the light to travel straight in a direction from the D-plane toward the C-plane without deviating to the left and right, while repeatedly experiencing total reflection in the fourth section, with the result that the light is extracted from the light guide plate 60 by means of the light extraction pattern formed in the third section. Similarly, light emitted by the LEDs 65c disposed on the C-plane of the light guide plate 61 is extracted from the second section, and light emitted by the LEDs 65d disposed on the D-plane is extracted from the fourth section. Such sections from which the light from the LEDs is extracted will be referred to as "light emission sections".

For each of the light guide plates 60 and 61, the light extraction pattern is formed such that the density thereof is the lowest on the side closest to the LEDs and increases with the distance from the LEDs. On the other hand, the amount of incident light from the LEDs decreases as the distance from the LEDs increases. Thus, the light emission sections emit light with a uniform luminance.

Provided on the A-plane of the light guide plate 60 in the second section and also on the A-plane of the light guide plate 61 in the third section, both sections being situated between the light emission sections, as shown in FIGS. 2 and 3, are light absorbing layers 82, which function as light absorbers for absorbing light traveling through the light guide plates 60 and 61. The light absorbing layers 82 will be described in detail later.

The light guide plates 60 and 61 are made of a transparent material, such as acrylic, polycarbonate, or glass, and have a thickness of, for example, 0.4 mm. FIG. 5 is a cross-sectional view illustrating the shape of the prisms 80 formed across the B-plane of the light guide plate 60. As shown in FIG. 5, the prisms 80 formed across the light guide plate 60 are in the shape of V-like grooves and extend vertical to the plane of the figure. Note that although not shown in the figure, the prisms formed across the B-plane of the light guide plate 61 also have the same shape as those of the light guide plate 60. Moreover, the shape of the prisms 80 formed across the light guide plates 60 and 61 is not limited to the V-like groove shape, and the prisms 80 may be formed in the shape of, for example, outwardly projecting protrusions, trapezoidal prisms, or shallow cylinders, as shown in FIG. 6.

The light guide plate 61 has the reflective sheet 92 disposed on the A-plane, as shown in FIG. 2. The reflective sheet 92 is a sheet for reflecting light emitted toward the back-surface side by the light guide plate 61 and thereby returning the light back to the light guide plate 61. Examples of the reflective sheet 92 include a white sheet for diffusely reflecting light leaking from the light guide plate 61 and thereby returning the light to the light guide plate 61 and a mirror-surface sheet for specularly reflecting such light and thereby returning the light to the light guide plate 61.

The light guide plate 60 has the optical sheet 91 disposed on the B-plane. The optical sheet 91 is a stack of, for example, a diffusion sheet, a prism sheet, and a deflective/reflective sheet, and typically used is a stack of, in order from the light guide plate 60 side, a diffusion sheet, a prism sheet, another prism sheet, and a deflective/reflective sheet. Here, the two prism sheets are sheets formed with respective prisms extending perpendicularly to each other.

The light guide plates 60 and 61 are covered by frames (not shown) made of white polycarbonate resin at the side surfaces, excluding the C- and D-planes. Accordingly, light emitted from the side surfaces of the light guide plates 60 and 61 is reflected by the frames back into the light guide plates 60 and 61, resulting in improved light use efficiency and hence increased luminance of light emitted toward the display-surface side. Moreover, examples of the frame include a double-sided tape used for fixing the light guide plate 60 to the liquid crystal panel 20 and a frame or bezel (not shown) used for maintaining the shape of the light guide plate 60.

The two stacked light guide plates 60 and 61 have the LEDs 65c and 65d respectively disposed on the C- and D-planes, and the LEDs 65c and 65d constitute the light source 65. In the present embodiment, these LEDs 65c and 65d are white LEDs but each may be a combination of LEDs respectively emitting red, green, and blue light.

Figure 7:
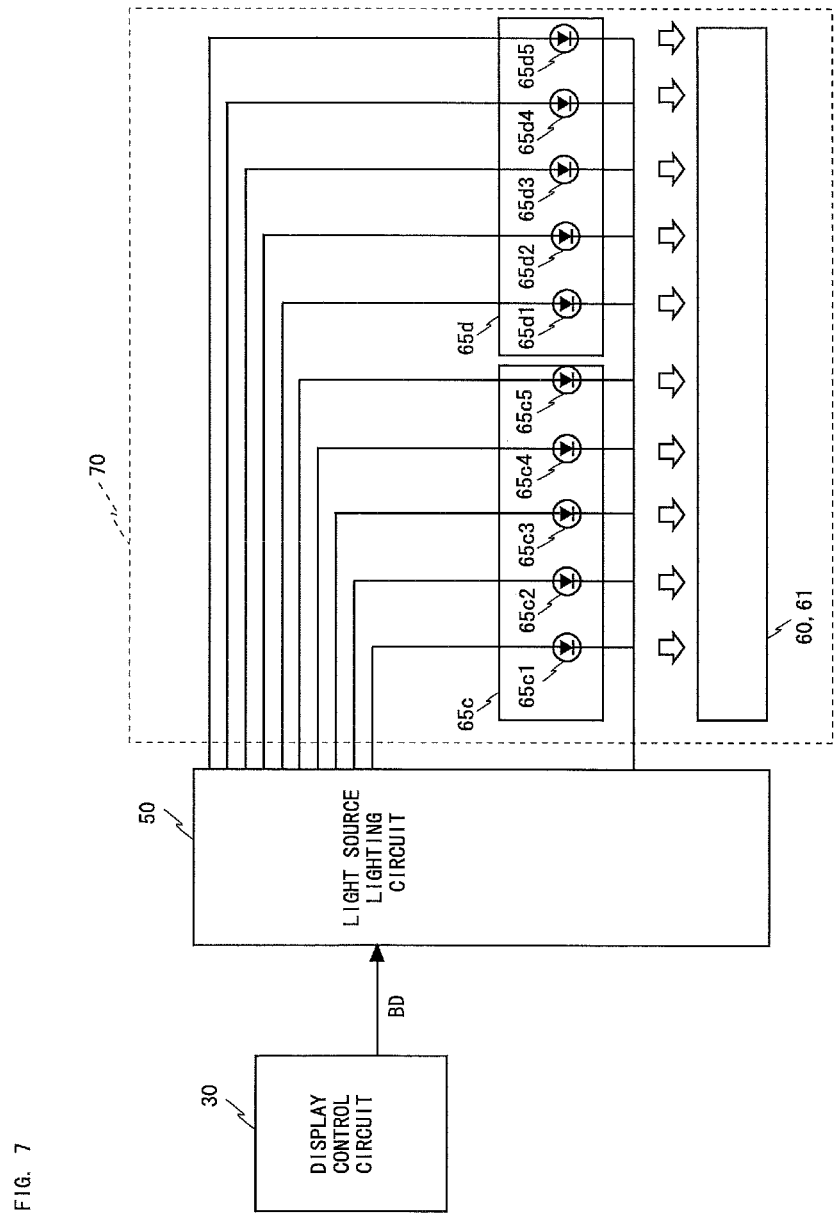
FIG. 7 is a circuit diagram illustrating a manner in which LEDs disposed on C- and D-planes of one light guide plate are connected to a light source lighting circuit, which controls light emission intensities of the LEDs.

FIG. 7 is a circuit diagram illustrating a manner in which the light source lighting circuit 50, which controls light emission intensities of LEDs $65c_1$ to $65c_5$ and LEDs $65d_1$ to $65d_5$ respectively disposed on the C- and D-planes of the light guide plate 60, is connected to the LEDs $65c_1$ to $65c_5$ and $65d_1$ to $65d_5$. In FIG. 7, for simplification of description, the number of LEDs disposed on each side surface is five, but in actuality, a number of LEDs are disposed on each side surface. The ten LEDs $65c_1$ to $65c_5$ and $65d_1$ to $65d_5$ are connected in parallel and to the light source lighting circuit 50. Accordingly, the light source lighting circuit 50 sets voltage values to be applied to the LEDs $65c_1$ to $65c_5$ and $65d_1$ to $65d_5$, in accordance with luminance data BD provided for each corresponding one of the LEDs by the display control circuit 30, and applies the voltage values to the LEDs. In this manner, the light source lighting circuit 50 drives the LEDs 65c and 65d disposed on the C- and D-planes of the light guide plates 60 and 61 so as to control the respective light emission intensities independently of one another. As a result, the backlight unit 70 can irradiate the liquid crystal panel with a different amount of light from each of the LEDs $65c_1$ to $65c_5$ and $65d_1$ to $65d_5$.

<1.3 Light Absorber>

Figure 31:
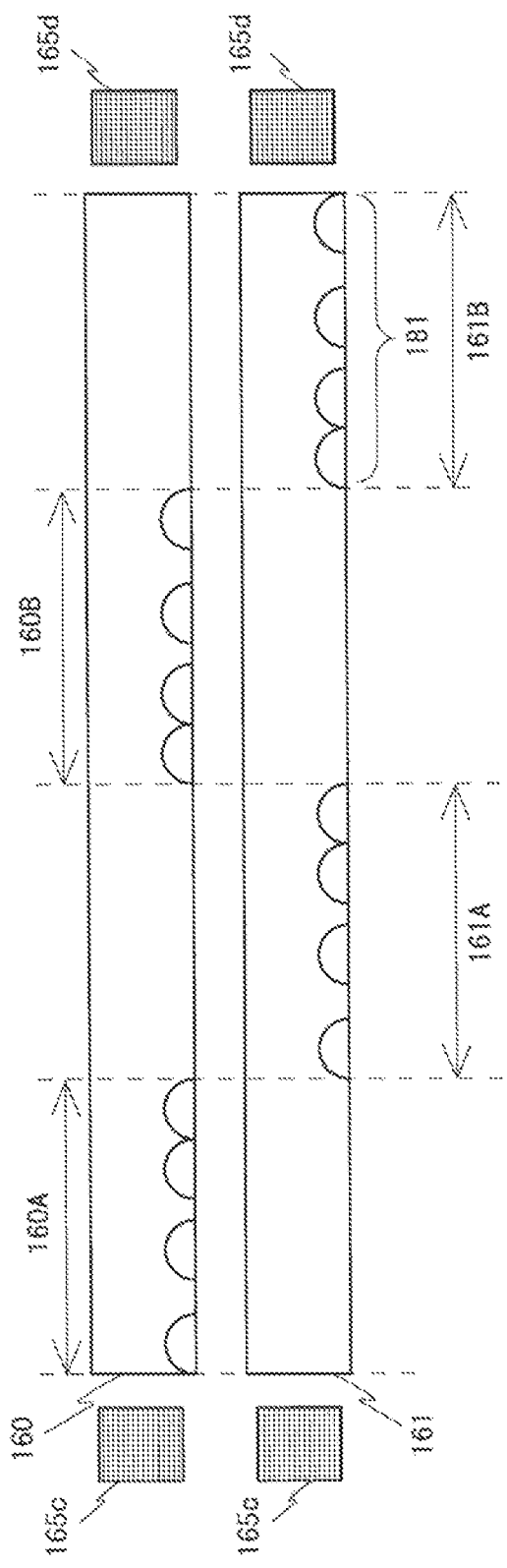
FIG. 31 is a cross-sectional view illustrating the configuration of a conventional backlight unit capable of two-dimensional local dimming.
Figure 32:
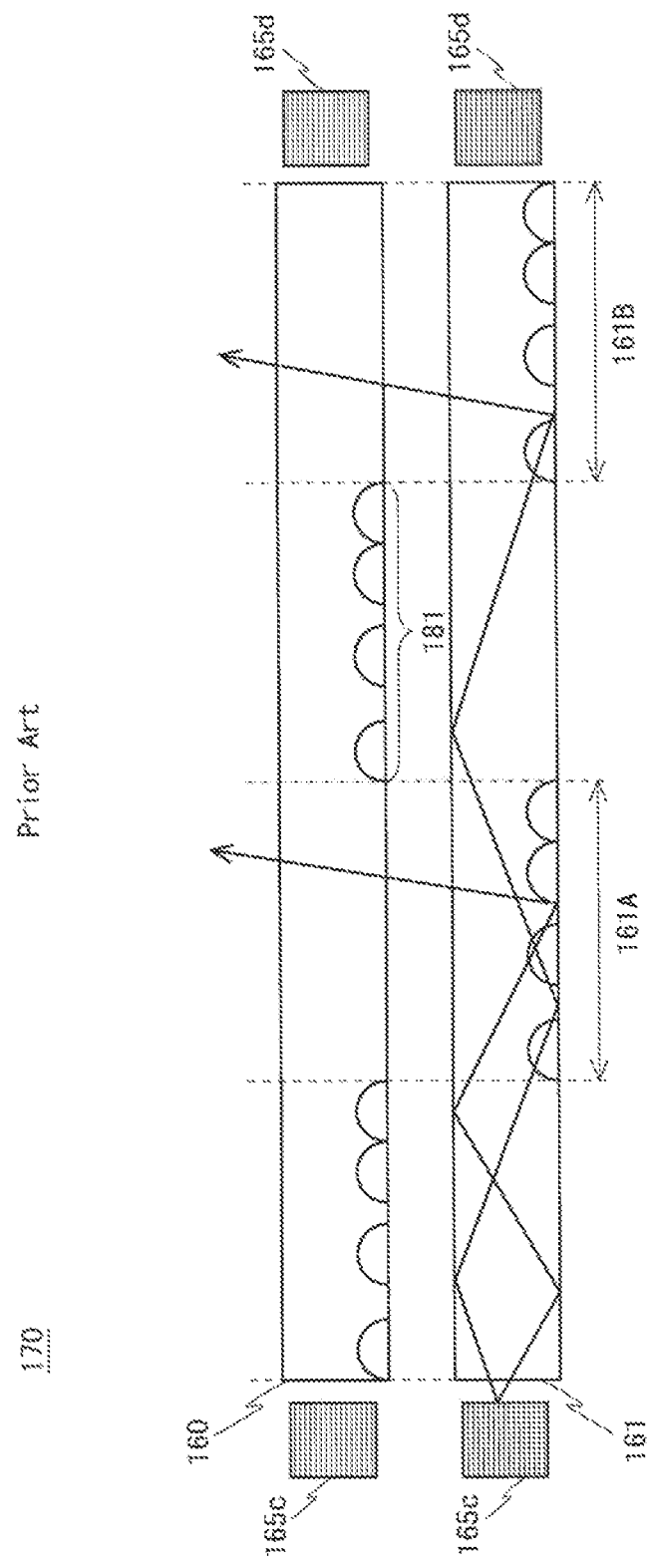
FIG. 32 is a diagram illustrating paths of light through the backlight unit shown in FIG. 31.

Some of the light emitted by the LEDs 165c disposed on the C-plane of the light guide plate 161 might travel to and be extracted from the light emission section 161B without being extracted from the light emission section 161A, from which the light should be extracted, as shown in FIG. 31 and as described in the PROBLEMS TO BE SOLVED BY THE INVENTION section. Since the light emission section 161B is the section from which the light emitted by the LEDs 165d disposed on the D-plane should originally be extracted, the light emitted by the LEDs 165c and extracted from the light emission section 161B becomes stray light, which might contribute to reduced image contrast. Therefore, to prevent the light that cannot be extracted from the light emission section 161A from traveling to the light emission section 161B, it is necessary to provide the light guide plate 161 with a light absorber for absorbing such unextracted light. Similarly, it is also necessary to provide the light guide plate 160 with such a light absorber.

Figure 8:
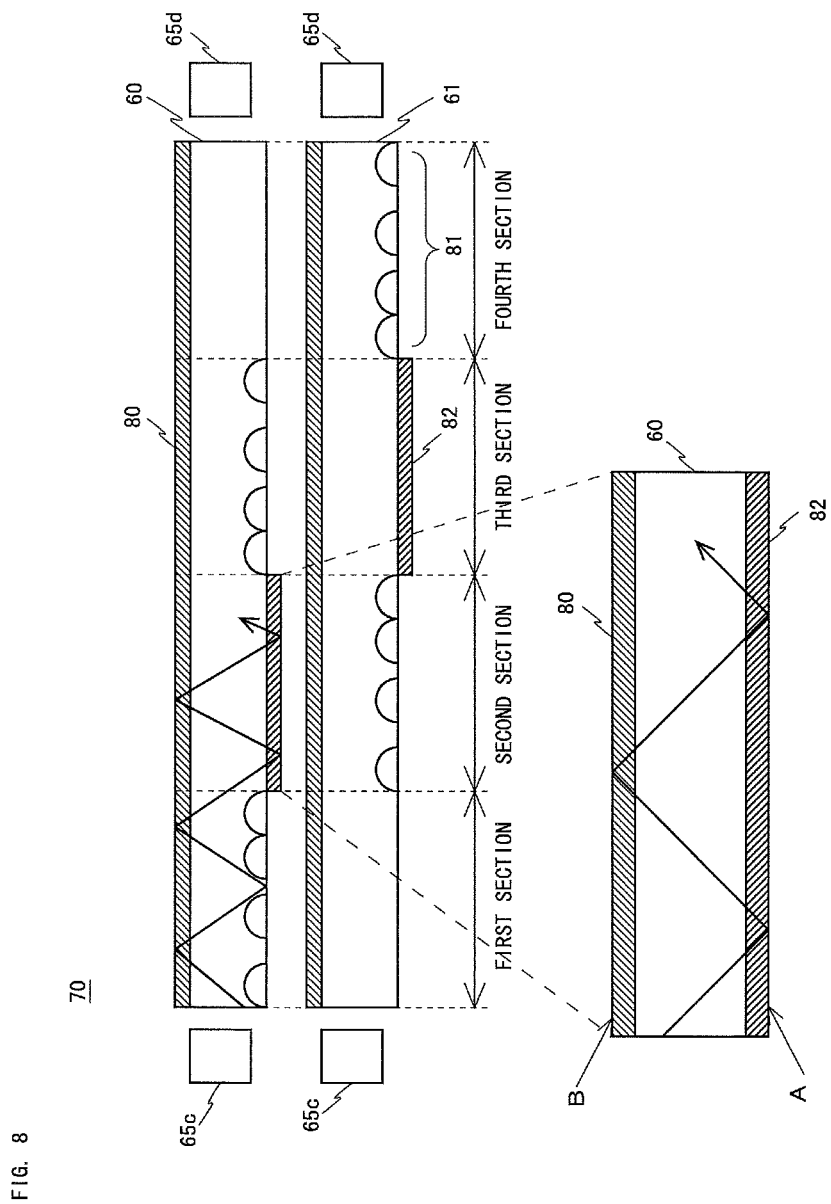
FIG. 8 is a cross-sectional view of the backlight unit shown in FIG. 2, taken along X-direction.

FIG. 8 is a cross-sectional view of the backlight unit 70 shown in FIG. 2, taken along the X-direction. To prevent occurrence of stray light, a light absorbing layer 82, which functions as a light absorber, is formed on the A-plane of the light guide plate 60 in the second section between the first and third sections, and also on the A-plane of the light guide plate 61 in the third section between the second and fourth sections, as shown in FIG. 8. Accordingly, for example, light that travels to the second section of the light guide plate 60 without being extracted from the first section is transmitted through the light absorbing layer 82 and thereby gradually absorbed thereby when the light is travelling through the second section while repeatedly experiencing total reflection between the B-plane of the light guide plate 60 and the light absorbing layer 82, with the result that much of the light is absorbed before the light is passed through the second section. Consequently, the light that travels through the second section to the third section is significantly reduced, and therefore, the light from the LEDs 65c that is extracted from the third section as stray light is also significantly reduced.

Furthermore, the light absorbing layer 82 provided in the second section absorbs not only the light from the LEDs 65c that travels to the second section without being extracted from the first section but also the light from the LEDs 65d that travels to the second section without being extracted from the third section. Thus, both the light from the LEDs 65c that is extracted from the third section as stray light and the light from the LEDs 65d that is extracted from the first section as stray light are significantly reduced.

The path along which light travels through the second section will be described with reference to an enlarged portion of FIG. 8. As shown in the enlarged portion, some of the light from the LEDs 65c that travels through the second section of the light guide plate 60 toward the third section is transmitted through the light absorbing layer 82 after exiting the light guide plate 60 and striking on the light absorbing layer 82 because the light guide plate 60 and the light absorbing layer 82 are almost equal in refractive index, and the transmitted light is totally reflected at an interface between the light absorbing layer 82 and an air layer. The totally reflected light is transmitted back through the light absorbing layer 82, and the light is incident on the light guide plate 60 and travels through the light guide plate 60 toward the B-plane. The light that is incident on the B-plane is totally reflected at an interface between the B-plane and the air layer before traveling back toward the light absorbing layer 82. In this manner, the light travels through the second section toward the third section while repeatedly experiencing total reflection.

Figure 9:
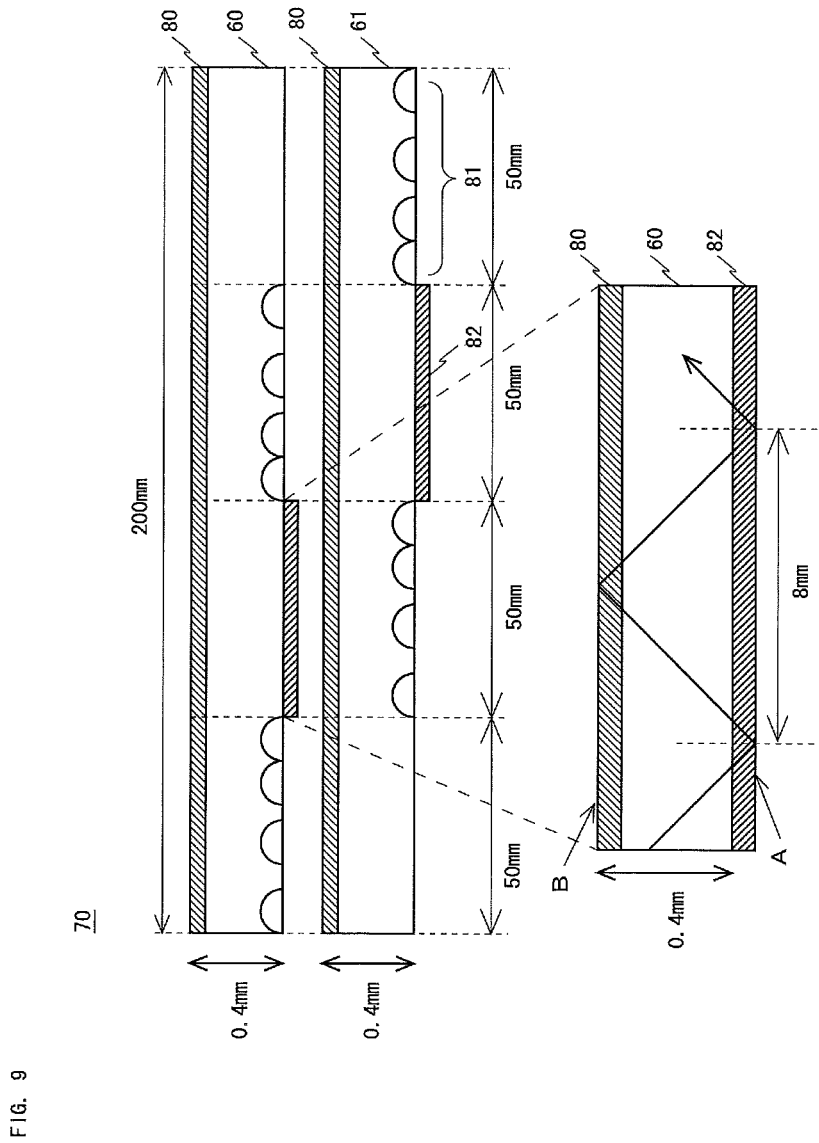
FIG. 9 is a cross-sectional view of the backlight unit shown in FIG. 8, annotating an example set of standard dimensions.

FIG. 9 is a cross-sectional view annotating an example set of standard dimensions of the backlight unit 70 shown in FIG. 8. As shown in FIG. 9, for example, each of the light guide plates 60 and 61 has a length of 200 mm in the X-direction, with each section being 50 mm long, and has a thickness of 0.4 mm, and light is assumed to travel in a direction at an angle of 45° to the A- and B-planes of the light guide plates 60 and 61. Moreover, the light absorbing layer 82 is typically a thin film having a thickness of approximately 10 μm.

In this case, as shown in an enlarged portion of FIG. 9, light that travels through the light guide plate 60 strikes on the light absorbing layer 82 once every 8 mm, and therefore, while traveling through the second section, whose length is 50 mm, the light strikes on the light absorbing layer 82 approximately 62 times, and the light incident on the light absorbing layer 82 is totally reflected by the interface between the light absorbing layer 82 and the air layer, back to the light guide plate 60 after being transmitted through the light absorbing layer 82 again. Accordingly, the light incident on the light absorbing layer 82 is transmitted through the light absorbing layer 82 twice by traveling back and forth. As a result, the light that travels through the light guide plate 60 is transmitted through the light absorbing layer 82 one hundred twenty-four times while traveling through the second section. Assuming that the light absorbing layer 82 has a front transmittance of 95%, the length of the path along which the light propagates through the light absorbing layer 82 at 45° is √2 times as much as the thickness of the light absorbing layer 82. As the path length increases, the transmittance is reduced in accordance with the increase to as low as approximately 93%. Therefore, after being transmitted through the light absorbing layer 82 one hundred twenty-four times, approximately 99.99% of the light is absorbed by the light absorbing layer 82, and the remaining approximately 0.01% of the light travels to the third section. From this, it can be appreciated that providing the light absorbing layer 82 in the second section renders it possible to absorb much of the light that might contribute to stray light. In this case, the light guide plate 60 is assumed to have a transmittance of 100%.

Furthermore, when light is transmitted through the light absorbing layer 82 sixty times, the light that travels to the third section without being absorbed in the second section and extracted from the third section as stray light is approximately 1.3% of incident light. However, the amount of light extracted is low, which causes no problem with low contrast during local dimming. In this manner, by providing the light absorbing layer 82 having a front transmittance of 95% or more on the A-plane of each of the light guide plates 60 and 61, it is rendered possible to allow much of the light that becomes stray light to be absorbed by the light absorbing layers 82. Further detailed studies conducted by the present inventors demonstrate that the light absorbing layer 82 that can be used in the present embodiment is a light absorbing layer having a front transmittance of 95 to 99%. Since providing such light absorbing layers 82 renders it possible to significantly reduce the light that is extracted as stray light, contrast during local dimming can be reduced to such an extent that no problem occurs.

Furthermore, when incident light from the LEDs 65c and 65d of the backlight unit 70 is transmitted through the light absorbing layers 82 provided on the light guide plates 60 and 61 before striking on the optical sheet 91, integrated front transmittance for the light guide plates is lower than the front transmittance of one light guide plate. Therefore, it is preferable to adjust the density of a black pigment to be used and the total area ratio of a black pattern, thereby allowing integrated transmittance for the light absorbing layers through which the light is transmitted to be 95 to 99%.

Figure 10:
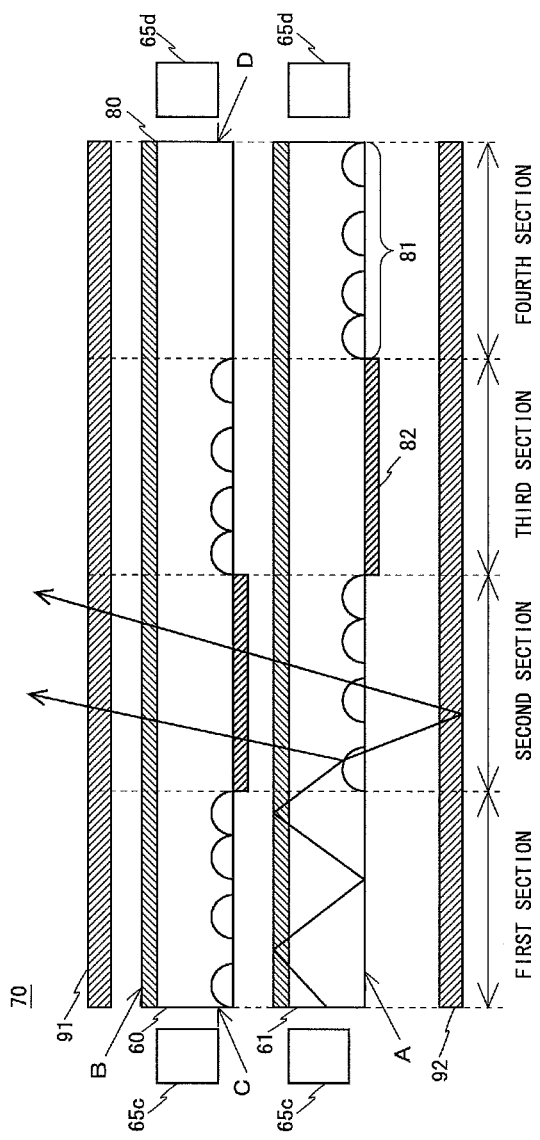
FIG. 10 is a diagram illustrating paths along which light extracted from a second section of one light guide plate in the backlight unit shown in FIG. 8 exits the other light guide plate.

FIG. 10 is a diagram illustrating paths along which light extracted from the second section of the light guide plate 61 in the backlight unit 70 shown in FIG. 8 exits the light guide plate 60. In the case where the transmittance after light passed through the light absorbing layer 82 once is 93% as in the aforementioned case, light from the LEDs 65c that is incident on the light guide plate 61 is extracted to the display-surface and back-surface sides by means of the light extraction pattern 81 formed in the second section of the light guide plate 61, as shown in FIG. 10. The light extracted to the back-surface side is reflected by the reflective sheet 92 provided on the back surface of the light guide plate 61. The reflected light is incident on the optical sheet 91 after being transmitted sequentially through the light guide plate 61, the light absorbing layer 82, and the light guide plate 60. The light extracted from the second section of the light guide plate 61 to the display-surface side is incident on the optical sheet 91 after being transmitted sequentially through the light absorbing layer 82 and the light guide plate 60. As for the light extracted from the second section of the light guide plate 61 to the display-surface side and the light extracted from the second section of the light guide plate 61 to the back-surface side, both of which are transmitted through the light absorbing layer 82 once, 93% thereof is incident on the optical sheet 91 because the transmittance after light transmitted through the light absorbing layer 82 once is 93%. Therefore, the light that is transmitted through the optical sheet 91 and thereby exits the backlight unit 70 is reduced in luminance only slightly.

Such a light absorbing layer 82 can be formed using a black pigment, which absorbs light of all wavelengths, rather than only a specific color. In this case, to allow the front transmittance of the light absorbing layer 82 to be 95 to 99%, the black pigment is adjusted in density to obtain a "light black pigment" to be used for the light absorbing layer 82, or the thickness of the light absorbing layer 82, which is typically about 10 μm, is suitably adjusted. Moreover, examples of the method for forming such light absorbing layers 82 on the light guide plates 60 and 61 include screen printing and photolithography using a photoresist.

Figure 11:
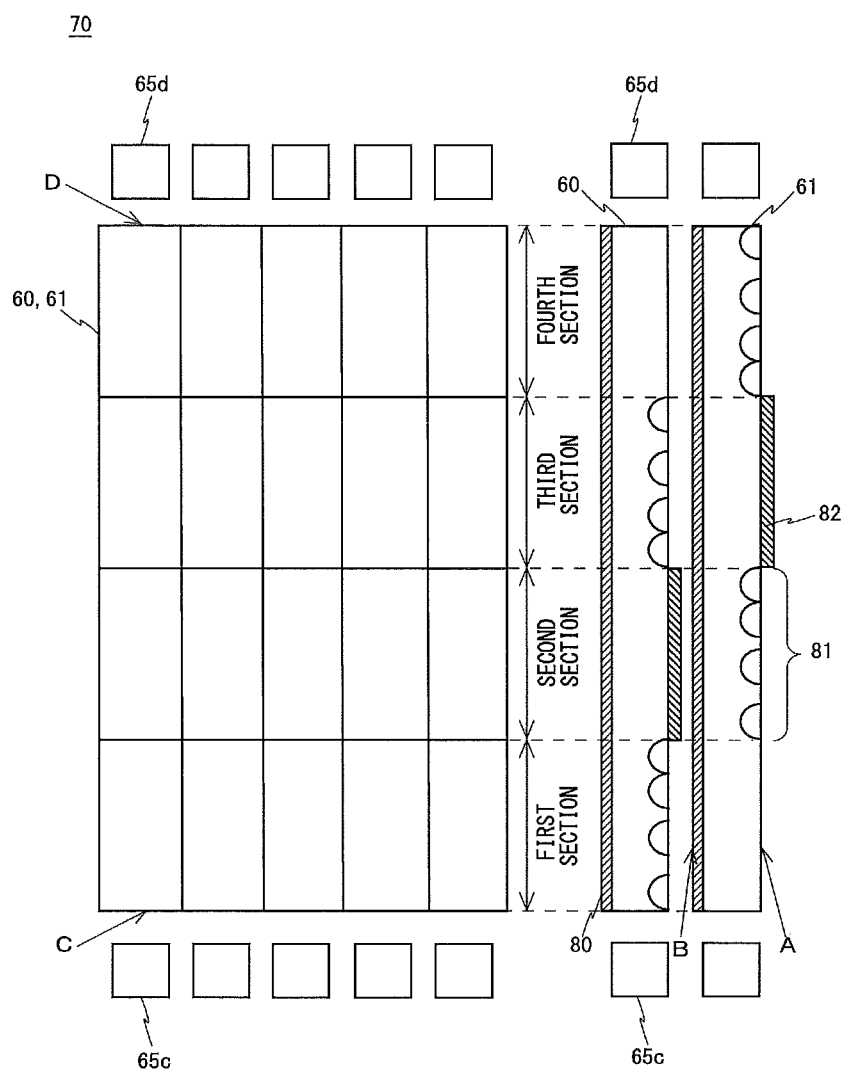
FIG. 11 is a diagram of the backlight unit shown in FIG. 2 driven by two-dimensional local dimming.

FIG. 11 is a diagram of the backlight unit 70 driven by two-dimensional local dimming. In the backlight unit 70 shown in FIG. 11, each of the two light guide plates 60 and 61 is divided into four sections and has five LEDs 65c and five LEDs 65d respectively disposed on the C- and D-planes. The light absorbing layer 82 is formed on the A-plane of the light guide plate 60 in the second section and also on the A-plane of the light guide plate 61 in the third section; a total of 20 LEDs 65c and 65d disposed on the light guide plates 60 and 61 are controlled individually in terms of luminance. In this manner, two-dimensional local dimming is performed so as to individually change luminances of light emitted from the 20 sections set in the backlight unit 70. Thus, the contrast of an image displayed on the liquid crystal panel 20 can be inhibited from being reduced.

<1.4 Effects>

In the present embodiment, even when light from the LEDs 65c, which should be extracted by means of the light extraction pattern 81 provided in the first section of the light guide plate 60, travels to the second section without being extracted, as shown in FIG. 8, the light repeatedly strikes on the light absorbing layer 82 formed in the second section, with the result that much of the light is absorbed in the second section. Accordingly, little of the light from the LEDs 65c that is not extracted from the first section is extracted by the light extraction pattern 81 provided in the third section, from which light from the LEDs 65d should originally be extracted, with the result that image contrast can be prevented from being reduced due to stray light. Moreover, since the front transmittance of the light absorbing layer 82 is as high as 95 to 99%, even when light emitted by the LEDs 65c and 65d is transmitted through the light guide plates 60 and 61 with the light absorbing layers 82, the luminance thereof can be kept from being significantly reduced.

<1.5 Variants>

Figure 12:
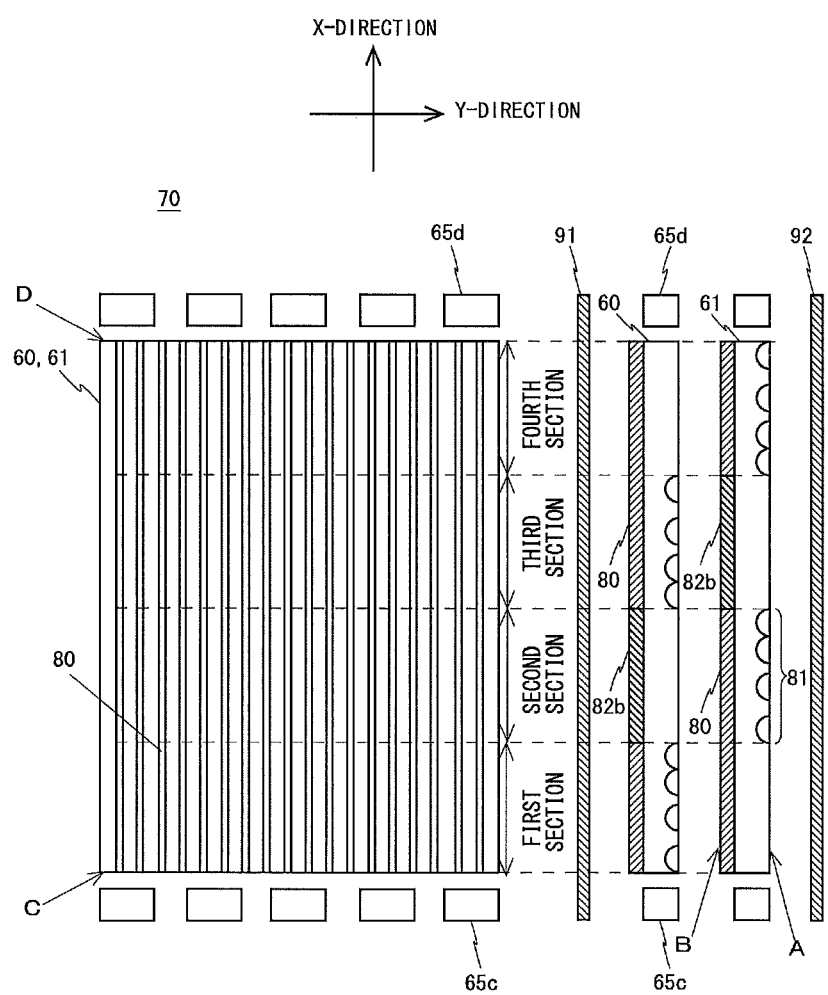
FIG. 12 is a diagram where a light absorbing layer is formed in the second section on the B-plane of one light guide plate included in the backlight unit shown in FIG. 2 and also in a third section on the B-plane of the other light guide plate.
Figure 13:
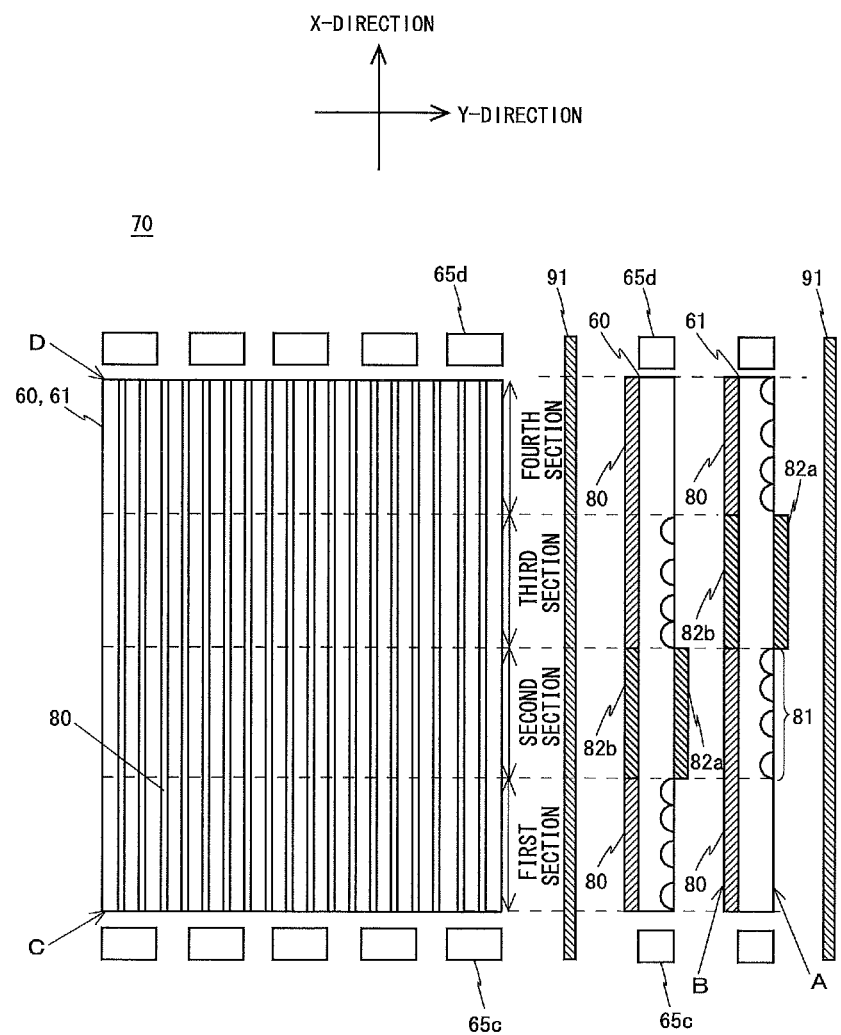
FIG. 13 is a diagram where light absorbing layers are formed in the second section on both A- and B-planes of one light guide plate included in the backlight unit shown in FIG. 2 and also in the third section on both A- and B-planes of the other light guide plate.

In the embodiment, the light absorbing layer 82 is described as being formed on the A-plane of the light guide plate 60 in the second section and also on the A-plane of the light guide plate 61 in the third section. However, a light absorbing layer 82b may be formed on the B-plane of the light guide plate 60 in the second section and also on the B-plane of the light guide plate 61 in the third section, as shown in FIG. 12. Alternatively, light absorbing layers 82a and 82b may be formed respectively on the A- and B-planes of the light guide plate 60 in the second section, and also respectively on the A- and B-planes of the light guide plate 61 in the third section, as shown in FIG. 13. Note that in the case where the light absorbing layers 82a and 82b for which the front transmittance is 95% are provided on the opposite surfaces of each of the light guide plates 60 and 61, as shown in FIG. 13, integrated front transmittance for light successively transmitted through the light absorbing layers 82a and 82b is reduced to approximately 90%. Accordingly, it is preferable to adjust the density of the black pigment that constitutes the light absorbing layer 82 and the thickness of the light absorbing layer 82, thereby allowing the integrated front transmittance for light successively transmitted through the light absorbing layers 82a and 82b to be 95% or more.

Figure 14:
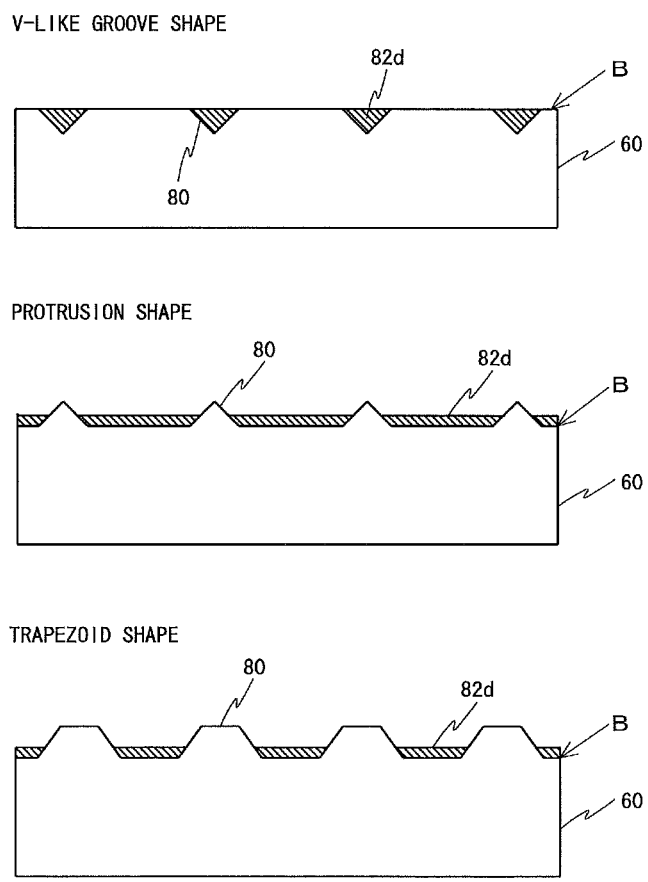
FIG. 14 provides views illustrating light absorbing layers formed on B-planes of light guide plates provided with prisms of various shapes shown in FIGS. 5 and 6.

FIG. 14 provides views illustrating light absorbing layers 82b formed on B-planes of light guide plates 60 provided with prisms 80 in various shapes shown in FIGS. 5 and 6. In the case of the light guide plate 60 with prisms 80 formed in the shape of V-like grooves, light absorbing layers 82 are embedded in the prisms 80, as shown in FIG. 14. Moreover, in the case of the light guide plate 60 with prisms 80 formed in the shape of protrusion or trapezoidal prisms, light absorbing layers 82b are formed between the prisms 80 across the surface of the light guide plate 60. However, in the case of the shallow cylindrical prisms 80 shown in FIG. 6, the surface of the light guide plate 60 is completely covered by the prisms 80, and therefore, no light absorbing layers 82b can be formed on the B-plane. Note that FIG. 14 describes the light guide plate 60, but the same description also applies to the light guide plate 61.

Figure 15:
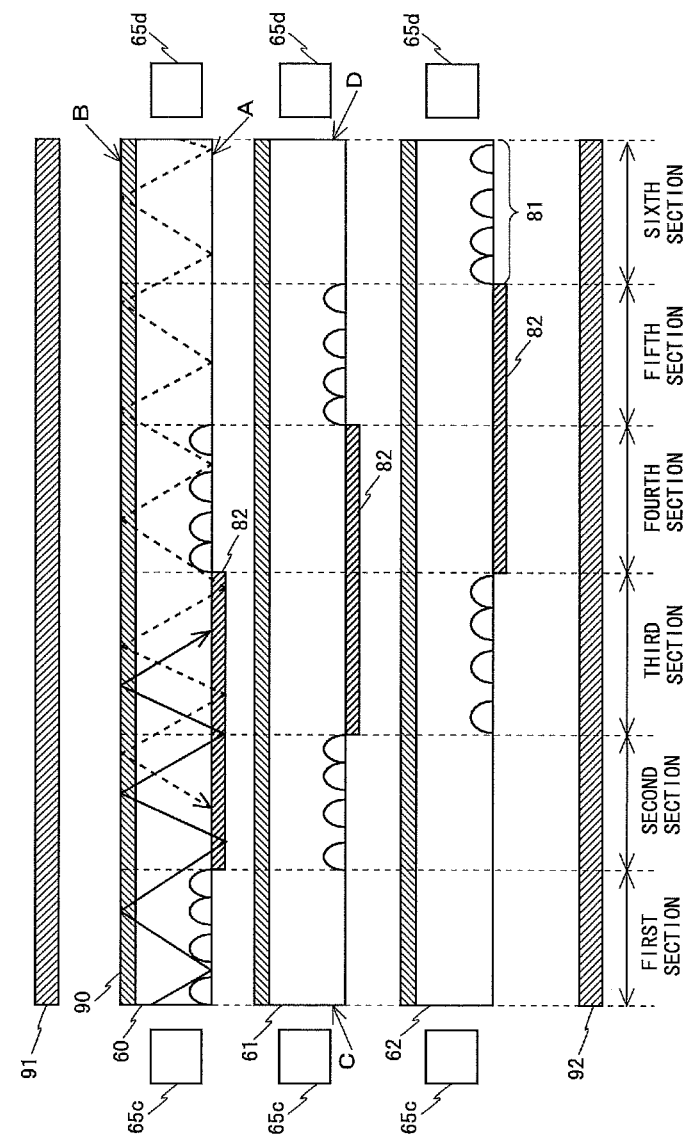
FIG. 15 is a cross-sectional view of a backlight unit in a variant of the first embodiment where three light guide plates are sequentially stacked.

FIG. 15 is a cross-sectional view of a backlight unit 70 in which three light guide plates 60 to 62 are sequentially stacked. The three light guide plates 60 to 62 are stacked, as shown in FIG. 15, each of the light guide plates 60 and 62 is divided into four sections, and the light guide plate 61 situated therebetween is divided into five sections. However, in FIG. 15, for convenience's sake, the light guide plates 60 to 62 are depicted as being divided into six sections, i.e., first to sixth sections, such that light extraction patterns 81 do not overlap one another in the stacking direction. The light guide plates 60 to 62 have LEDs 65c disposed on respective C-planes and LEDs 65d disposed on respective D-planes. The light extraction patterns 81 are formed on the A-plane of the light guide plate 60 in the first and fourth sections, on the A-plane of the light guide plate 61 in the second and fifth sections, and on the A-plane of the light guide plate 62 in the third and sixth sections, and these sections serve as light emission sections. The light emission sections are disposed so as not to overlap one another in the stacking direction when the light guide plates 60 to 62 are placed on one another.

Furthermore, for each of the light guide plates 60 to 61, a light absorbing layer 82 is formed on the B-plane in sections between two light emission sections. For example, in the case of the light guide plate 60, much of the light that is emitted by the LEDs 65c and passed through the first section is absorbed by the light absorbing layer 82 in the second and third sections, as shown in FIG. 15, and therefore, almost no light travels to the fourth section. As a result, there is little possibility that the light emitted by the LEDs 65c is extracted from the fourth section as stray light. Similarly, much of the light that is emitted by the LEDs 65d and passed through the fourth section is absorbed by the light absorbing layer 82 in the second and third sections, and therefore, almost no light travels to the first section. As a result, much of the light emitted by the LEDs 65c is extracted from the first section, and much of the light emitted by the LEDs 65d is extracted from the fourth section. The above similarly applies to the light guide plates 61 and 62.

Figure 16:
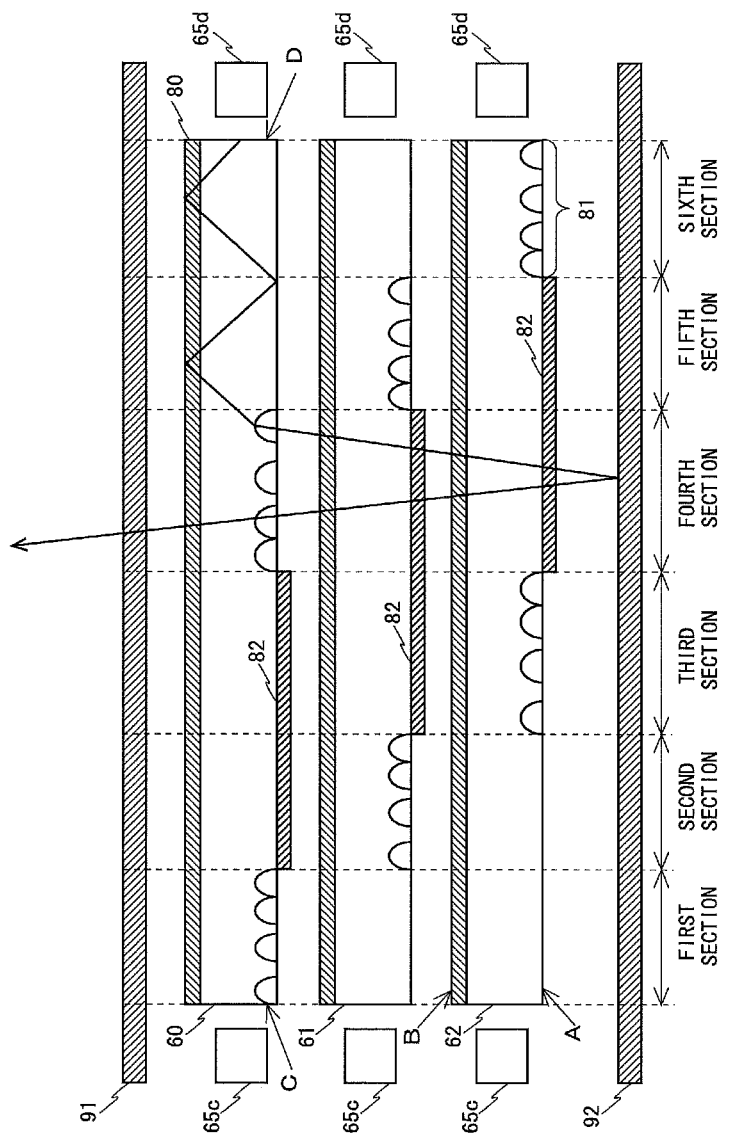
FIG. 16 is a diagram illustrating a path of light extracted from a fourth section of the light guide plate shown in FIG. 15 to a back-surface side.

FIG. 16 is a diagram illustrating a path of light extracted from the fourth section of the light guide plate 60 to the back-surface side. Light from the LEDs 65d that is incident on the light guide plate 60 and extracted from the fourth section to the back-surface side is transmitted through the light absorbing layers 82 respectively formed on the light guide plates 61 and 62 and is reflected by the reflective sheet 92 upon incidence thereon, as shown in FIG. 16. The reflected light is transmitted back through the light absorbing layers 82 respectively formed on the light guide plates 61 and 62 before exiting the light guide plate 60 from the fourth section. In this case, the light extracted from the light guide plate 60 to the back-surface side is transmitted through the light absorbing layer four times in total before exiting to the display-surface side. Assuming that the front transmittance of the light absorbing layer 82 is 95%, light transmittance is reduced to approximately 75% after light is transmitted through the light absorbing layer 82 four times. Accordingly, it is preferable to adjust the density of the black pigment that constitutes the light absorbing layer 82 and the thickness of the light absorbing layer 82, thereby allowing the integrated front transmittance for one or more light absorbing layers 82 through which incident light is transmitted before the exit to be 95% or more in each of the first to sixth sections of the backlight unit 70.

2. Second Embodiment

The configuration and the operation of a liquid crystal display device including a backlight unit according to a second embodiment of the present invention are the same as those in the first embodiment, and therefore, any figures and descriptions thereof will be omitted.

<2.1 Configuration of the Backlight Unit>

The configuration of the backlight unit according to the present embodiment is the same as in the first embodiment, excluding some features of the light absorber. Therefore, in the present embodiment, only the light absorber will be described without elaborating upon the same elements as those in the first embodiment.

<2.2 Light Absorber>

FIG. 17 provides plan views and cross-sectional views illustrating the configuration of the backlight unit according to the present embodiment; more specifically, FIG. 17(A) provides a plan view and a cross-sectional view of the light guide plate 60, and FIG. 17(B) provides a plan view and a cross-sectional view of the light guide plate 61. As in the first embodiment, the light guide plate 60 has the light extraction patterns 81 formed on the A-plane in the first and third sections in order to extract light, as shown in FIG. 17(A). Also, the light guide plate 61 has the light extraction patterns 81 formed on the A-plane in the second and fourth sections, as shown in FIG. 17(B).

The light guide plate 60 has a plurality of black pattern elements 83 formed on the A-plane in the second section between the first and third sections, and the black pattern elements 83 function as a light absorber for absorbing light from the LEDs 65c that passed through the first section and also light from the LEDs 65d that passed through the third section in order to keep the light passed through the first section from traveling to the third section and also to keep the light passed through the third section from travelling to the first section. Similarly, the light guide plate 61 also has a plurality of black pattern elements 83 formed in the third section and functioning as a light absorber for absorbing light.

For example, in the second section of the light guide plate 60, the black pattern elements 83 are formed of a black pigment having an absorbance of 90 to 100% (i.e., transmittance is 0 to 10%), such that the ratio of the total area of all the black pattern elements 83 to the area of the second section is 5% or less. This allows the front transmittance of the light guide plate 60 with the black pattern elements 83 to be 95% or more. Similarly, in the third section of the light guide plate 61 also, the black pattern elements 83 are formed such that the ratio of the total area of all the black pattern elements 83 to the area of the third section is 5% or less, thereby allowing the front transmittance of the light guide plate 61 with the black pattern elements 83 to be 95% or more. The reason why the front transmittance is set to be 95% or more for both the light guide plates 60 and 61 with the black pattern elements 83 is the same as the reason why the front transmittance of the light absorbing layer 82 in the first embodiment is set to be 95% or more and therefore will not be elaborated upon. Note that further detailed studies conducted by the present inventors demonstrate that black pigments having an absorbance of 90 to 100% can be used for forming the black pattern elements 83.

The black pattern element 83 is, for example, a dot, as shown in FIGS. 17(A) and 17(B), and the diameter thereof is preferably 0.1 mm or less. The reason for this is that in the case where the diameter of the black pattern element 83 is more than 0.1 mm, when the liquid crystal panel displays an image while being backlit with light from the backlight unit, the viewer might see some black pattern elements 83 in the displayed image. Note that the shape of the black pattern element 83 is not limited to a dot, and may be, for example, a polygon having a maximum outer diameter of 0.1 mm or less. Moreover, the black pattern element 83 typically has a thickness of 10 μm.

Similar to the case of the first embodiment, examples of the method for forming such black pattern elements 83 on the A-planes of the light guide plates 60 and 61 include screen printing and photolithography using a photoresist.

In the present embodiment, the black pattern elements 83 are formed only on the A-planes of the light guide plates 60 and 61. However, similar to the case of the first embodiment, the black pattern elements 83 may be formed only on the B-plane or both the A- and B-planes of each of the light guide plates 60 and 61. In either case, such modifications are made similarly to the case of the first embodiment, and therefore, any figures illustrating such and any detailed descriptions thereof will be omitted.

<2.3 Effects>

In the present embodiment, since the absorbance of the black pigment used for forming the black pattern elements 83 is 90 to 100%, light incident on the black pattern elements 83 is almost certainly absorbed by the black pattern elements 83. Therefore, it is possible to more reliably reduce the light that becomes stray light and therefore possible to more reliably inhibit display image contrast from being reduced due to local dimming. Moreover, similar to the case of the first embodiment, the front transmittance of the light guide plates 60 and 61 with the black pattern elements 83 is as high as 95 to 99% of the front transmittance of the light guide plates 60 and 61 without the black pattern elements 83, and therefore, light emitted by the LEDs 65c and 65d can be kept from being significantly reduced in luminance even when the light is transmitted through the light guide plate 60 or 61 with the black pattern elements 83.

3. Third Embodiment

The configuration and the operation of a liquid crystal display device including a backlight unit according to a third embodiment of the present invention are the same as those in the first embodiment, and therefore, any figures and descriptions thereof will be omitted.

<3.1 Configuration of the Backlight Unit>

The configuration of the backlight unit according to the present embodiment is the same as in the first embodiment, excluding some specific features of the light absorber. Therefore, only the light absorber will be described without elaborating upon the same elements.

<3.2 Light Absorber>

FIG. 18 provides plan views and cross-sectional views illustrating the configuration of the backlight unit according to the present embodiment; more specifically, FIG. 18(A) provides a plan view and a cross-sectional view of the light guide plate 60, and FIG. 18(B) provides a plan view and a cross-sectional view of the light guide plate 61. As in the first embodiment, the light guide plate 60 has the light extraction patterns 81 formed on the A-plane in the first and third sections in order to extract light, as shown in FIG. 18(A). Similarly, the light guide plate 61 has the light extraction patterns 81 formed on the A-plane in the second and fourth sections, as shown in FIG. 18(B).

The light guide plates 60 and 61 have prisms 80 formed across the respective B-planes so as to extend from the C-planes to the D-planes. Formed in the second section of the light guide plate 60 and also in the third section of the light guide plate 61 are a plurality of slits 84 functioning as light absorbers. Each slit 84 extends in a direction perpendicular to the direction in which the prisms 80 extend, and typically has a width of 100 μm. The slit 84 has embedded therein a black pigment having an absorbance of 90 to 100%. Accordingly, almost all light incident on the slit 84 is absorbed.

Figure 19:
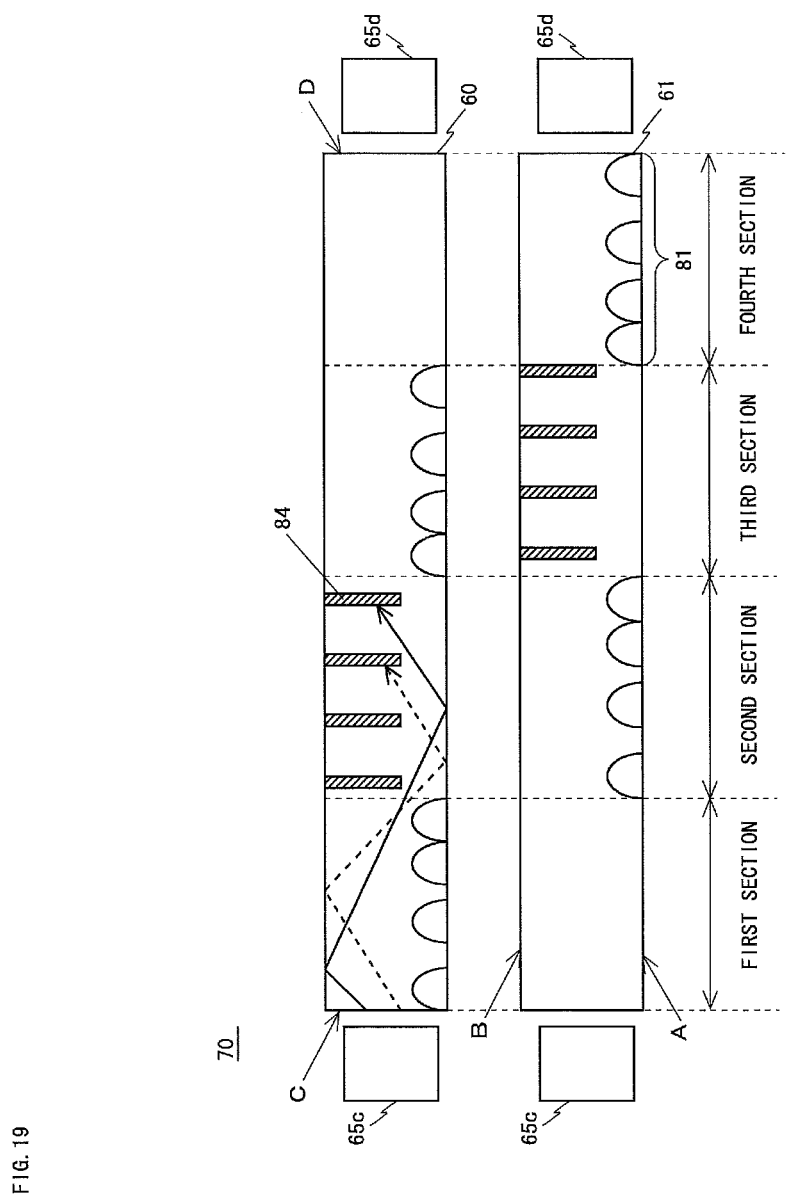
FIG. 19 is a diagram illustrating paths along which light travels within the light guide plate of the backlight unit shown in FIG. 18.

FIG. 19 is a diagram illustrating paths along which light travels within the light guide plate 60 of the backlight unit 70 according to the present embodiment. As shown in FIG. 19, any of the slits 84 formed in the second section absorb light that is emitted by the LEDs 65c disposed on a side surface (C-plane) of the light guide plate 60 and that travels to the second section without being extracted from the first section, where the light extraction pattern 81 is formed. Each slit 84 formed in the second section extends vertically to the plane of the figure and also into the light guide plate 60 from the B-plane up to a point as deep as 60% or less of the thickness of the light guide plate 60. The deeper the slit 84 becomes, the more light can be absorbed, but the strength of the light guide plate 60 becomes weaker. Accordingly, the depth of the slit 84 is preferably set to be 60% or less of the thickness of the light guide plate 60. In this manner, forming the slits 84 in the light guide plate 60 renders it easy for the light that traveled to the second section to be incident on side surfaces of the slits 84, and further, if light strikes on any slit 84 even once, the light is almost certainly absorbed in the black pigment embedded in the slit 84, with the result that significantly less light is passed through the second section to the third section.

Furthermore, in the present embodiment, as shown in FIG. 18(A), similar to the case of the second embodiment, the ratio of the total area of openings in all the slits 84 of the light guide plate 60 to the area of the B-plane in the second section is preferably set to be 1 to 5%. To this end, the ratio of the total area occupied by the openings in the slits 84 to the area of the B-plane in the second section is adjusted by adjusting the width of each slit and the number of slits. As a result, in the present embodiment also, the front transmittance of the light guide plate 60, including the slits 84 with the black pigment embedded therein, can be set to be 95% or more. Note that the shape and the function of the slits formed in the third section of the light guide plate 61 are the same as those of the slits 84 formed in the second section of the light guide plate 60 and therefore will not be elaborated upon. Moreover, for example, grooves with a light absorbing substance embedded therein, such as the slits 84 with the black pigment embedded therein, or grooves with a light absorbing substance applied to side surfaces, will also be referred to herein as "light absorbing grooves".

<3.3 Effects>

In the present embodiment, since the absorbance of the black pigment embedded in the slits 84 is 90 to 100%, light incident on the slits 84 is almost certainly absorbed by the slits. Therefore, it is possible to more reliably reduce the light that becomes stray light and therefore possible to more reliably inhibit display image contrast from being reduced due to local dimming. Moreover, the front transmittance of the light guide plates 60 and 61 with the slits 84 is as high as 95 to 99% of the front transmittance of the light guide plates 60 and 61 without the slits 84, and therefore, light transmitted to the display-surface side through the light guide plates 60 and 61 with the slits 84 is barely influenced by the slits 84. Accordingly, even when light emitted by the LEDs 65c and 65d can be kept from being significantly reduced in luminance even when the light is transmitted through the light guide plate 60 or 61 with the slits 84.

<3.4 Variants>

Figure 20:
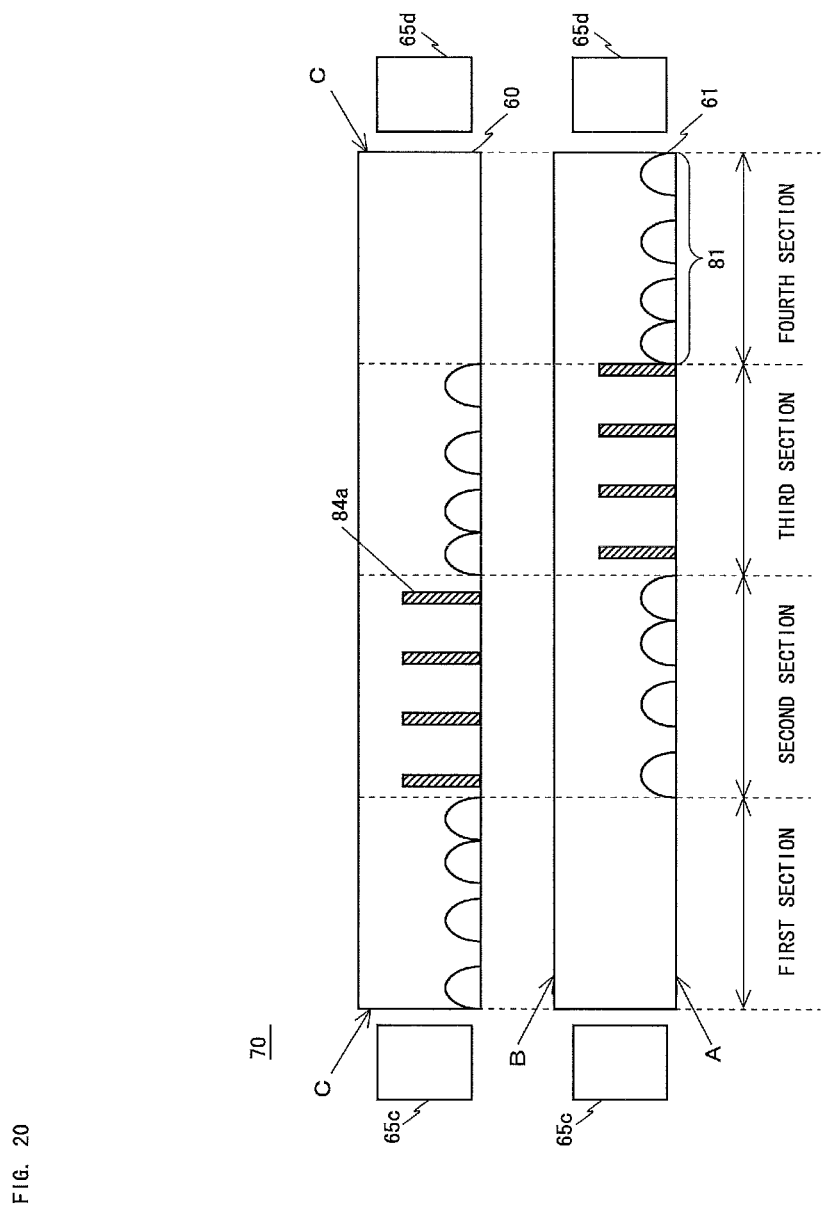
FIG. 20 is a cross-sectional view illustrating a part of a backlight unit in a variant of the third embodiment where slits are formed only in the A-planes of the light guide plates.
Figure 21:
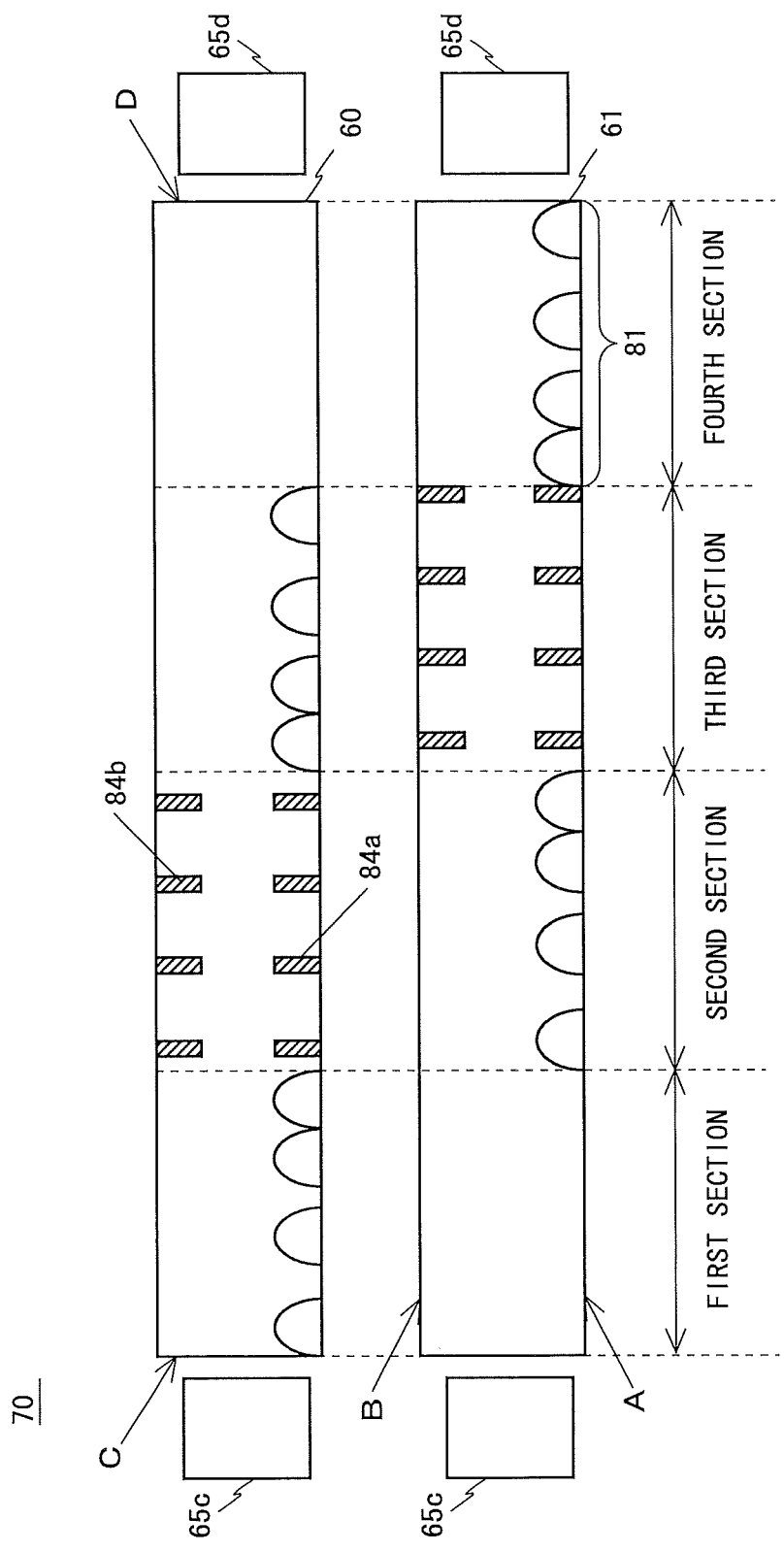
FIG. 21 is a cross-sectional view illustrating a part of a backlight unit in another variant of the third embodiment where slits are formed in both the A- and B-planes of the light guide plates.

The embodiment has been described with respect to the case where the light guide plate 60 has the slits 84 formed in the second section only in the B-plane. However, the light guide plate 60 may have the slits 84 formed in the second section only in the A-plane or both in the A- and B-planes. FIG. 20 is a cross-sectional view illustrating a part of a backlight unit 70 with slits 84a formed only in the A-plane of the light guide plate 60, and FIG. 21 is a cross-sectional view illustrating a part of a backlight unit 70 with slits 84a and 84b respectively formed in the A- and B-planes of the light guide plate 60. In the light guide plates 60 as shown in FIG. 20, for example, light transmitted through the first section, which serves as a light emission section, without being extracted can be efficiently absorbed by the slits 84 formed in the second section, and therefore, light that becomes stray light as a result of not being extracted from the second section but from the third section can be significantly reduced. Note that in the case of FIG. 21, a total depth of a pair of corresponding slits 84*a* and 84*b* is preferably equal to 60% or less of the thickness of the light guide plate 60.

Figure 22:
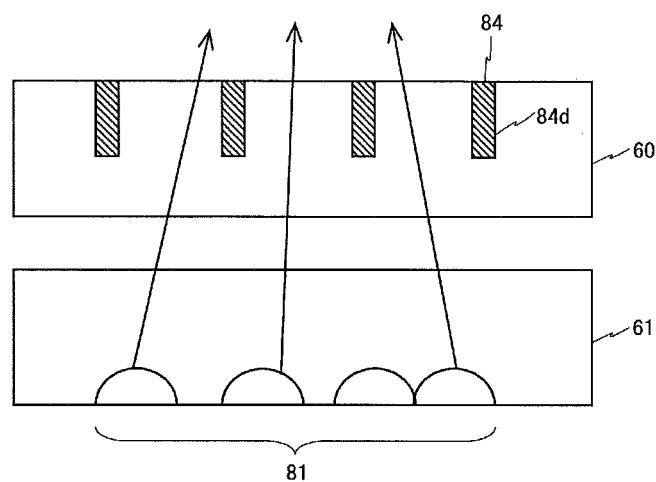
FIG. 22 is a diagram illustrating a path of light extracted to a display-surface side through the light guide plate with the slits.
Figure 23:
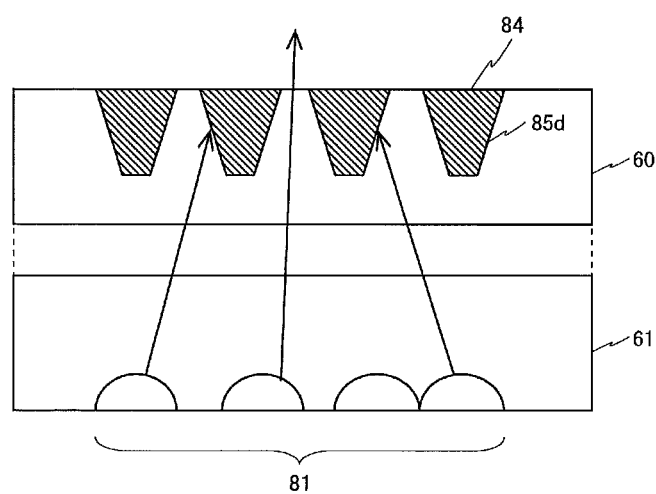
FIG. 23 is a diagram illustrating a path of light extracted to the display-surface side through a light guide plate with trapezoidal grooves.

Furthermore, the embodiment has been described regarding the slits 84 as an example of the light absorbing grooves. However, trapezoidal grooves 85 may be formed in place of the slits 84. FIG. 22 is a diagram illustrating paths along which light is extracted to the display-surface side through the light guide plate 60 with the slits 84, and FIG. 23 is a diagram illustrating paths along which light is extracted to the display-surface side through the light guide plate 60 with the trapezoidal grooves 85. The trapezoidal groove 85 formed in the light guide plate 60, as shown in FIG. 23, has a larger opening area in the B-plane than does the slit 84, and therefore, the ratio of the total area of the trapezoidal grooves 85 to the area of the B-plane is larger than the ratio of the total cross-sectional area of the slits 84 shown in FIG. 22 to the area of the B-plane. Accordingly, the trapezoidal grooves 85 render it possible to more readily absorb light extracted from the light emission section of the underlying light guide plate 61, resulting in a reduced front transmittance of the light guide plate 60. Consequently, when compared to the slits 84, less light is extracted to the display-surface side. Accordingly, it is necessary to reduce the number of trapezoidal grooves 85 or narrow the grooves, thereby reducing the total area ratio and increasing the front transmittance of the light guide plate 60. On the other hand, the trapezoidal groove 85 has a larger opening area than does the slit 84 and therefore has an advantage in being readily formed. Note that the shape of the light absorbing groove is not limited to either the slit 84 or the trapezoidal groove 85, and other shapes may be employed.

Furthermore, in the embodiment and the variants thereof, the black pigment 84*d* is embedded in the slit 84 or the trapezoidal groove 85. However, the black pigment 84*d* may be applied to the slit 84 or the trapezoidal groove 85 so as to cover at least side surfaces, as shown in FIG. 24. In either case, light incident on the slit 84 or the other absorber is absorbed by the black pigment 84*d* applied to the side surfaces, and therefore, effects similar to those achieved by the embodiment can be achieved.

4. Fourth Embodiment

The configuration and the operation of a liquid crystal display device including a backlight unit according to a fourth embodiment of the present invention are the same as those in the first embodiment, and therefore, any figures and descriptions thereof will be omitted.

<4.1 Configuration of the Backlight Unit>

The configuration of the backlight unit according to the present embodiment is the same as in the first embodiment, excluding some specific features of the light absorber. Therefore, only the light absorber will be described without elaborating upon the same elements.

<4.2 Light Absorber>

FIG. 25 provides plan views and cross-sectional views illustrating the configuration of the backlight unit according to the present embodiment; more specifically, FIG. 25(A) provides a plan view and a cross-sectional view of the light guide plate 60, and FIG. 25(B) provides a plan view and a cross-sectional view of the light guide plate 61. As in the first embodiment, the light guide plate 60 has the light extraction patterns 81 formed on the A-plane in the first and third sections in order to extract light, as shown in FIG. 25(A). Similarly, the light guide plate 61 has the light extraction patterns 81 formed on the A-plane in the second and fourth areas, as shown in FIG. 25(B). Each light guide plate has prisms 80 formed across the surface thereof so as to extend from the C-plane to the D-plane. The prisms 80 are provided such that both light emitted by the LEDs 65*c* that travels from the C-plane toward the D-plane and light emitted by the LEDs 65*d* that travels from the D-plane toward the C-plane are kept from deviating to the left and right.

In the light guide plate 60, each prism 80 includes a prism 86 in the second section, and the prism 86 has a black pigment embedded therein and also functions as a light absorbing groove for absorbing light passed through the first or third section to the second section. In the light guide plate 61, each prism 80 includes a prism 86 in the third section, and the prism 86 has a black pigment embedded therein and also functions as a light absorbing groove for absorbing light passed through the second or fourth area to the third section.

In this case, the black pigment embedded in the prism 86 may be a light black pigment having a front transmittance of 95 to 99%, as described in the first embodiment, or a black pigment having an absorbance of 90 to 100%, as described in the second embodiment. However, as for the prisms 80 formed across the entire surfaces of the light guide plates 60 and 61, it is difficult to form the prisms 86 by embedding such a black pigment in the prisms 80 only in the second section of the light guide plate 60 and the third section of the light guide plates 61. For example, when the black pigment having an absorbance of 90 to 100% is embedded in the prisms 80 in the second section of the light guide plate 60, the same black pigment is undesirably embedded in at least some of the prisms 80 in the first and third sections, which serve as light emission sections. As a result, light that should be extracted from the first or third section, which serves as the light emission section of the light guide plate 60, is absorbed in part by the embedded black pigment. Therefore, it is preferable to embed the black pigment having a front transmittance of 95 to 99%, as used in the first embodiment in order to form the light absorbing layer 82, in the prisms 86 in the second section of the light guide plate 60. The same applies to the prisms in the third section of the light guide plate 61.

Figure 26:
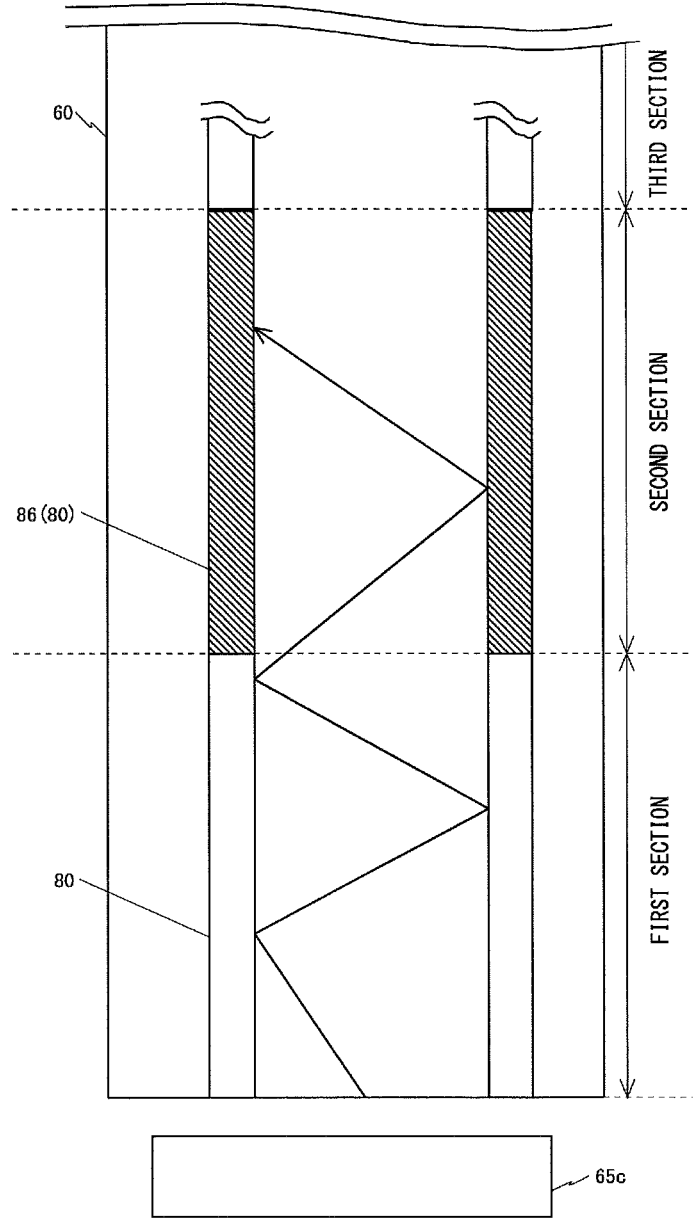
FIG. 26 is a diagram illustrating a path along which light emitted by an LED travels through the light guide plate from the first section toward the third section while hitting prisms in the fourth embodiment of the present invention.

FIG. 26 is a diagram illustrating a path along which light emitted by the LED 65*c* travels from the first section toward the third section while hitting the prisms 80 formed across the light guide plate 60. As shown in FIG. 26, the light emitted by the LEDs 65*c* travels through the first section with the light extraction pattern 81 to the second section, where the light continues to travel toward the third section while being repeatedly reflected by the prisms 86, which function as light absorbing grooves. When traveling within the second section in this manner, the light is gradually absorbed upon each incidence on any prism 86, by the light black pigment embedded in that prism 86. Accordingly, the light that traveled through the first section to the second section is significantly reduced as the light is passed through the second section to the third section. Thus, less light is extracted from the third section as stray light, with the result that image contrast can be inhibited from being reduced.

Figure 27:
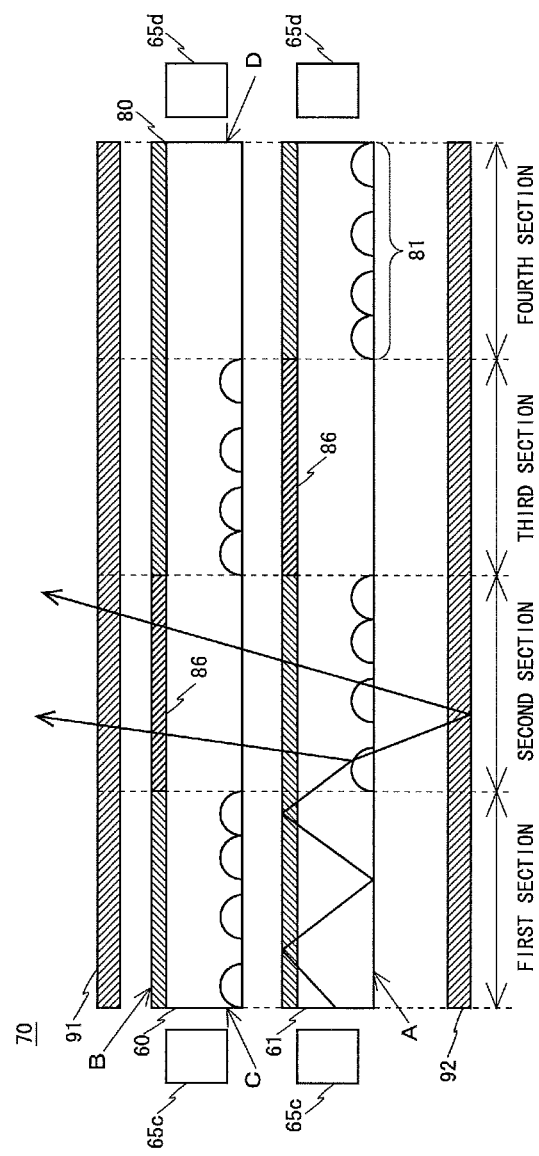
FIG. 27 is a diagram illustrating paths along which light extracted from the second section of one light guide plate in the backlight unit according to the fourth embodiment of the present invention exits the other light guide plate.

FIG. 27 is a diagram illustrating paths along which light extracted from the second section of the light guide plate 61 in the backlight unit 70 according to the present embodiment exits the light guide plate 60. As shown in FIG. 27, light emitted by the LEDs 65*c* is extracted to both the display-surface side and the back-surface side by the light extraction pattern 81 formed in the second section of the light guide plate 61. The light extracted to the back-surface side is reflected by the reflective sheet 92 provided on the back surface of the light guide plate 61. The reflected light is incident on the optical sheet 91 on the display surface-side after being transmitted sequentially through the light guide plate 61, the prism 86, and the light guide plate 60. The light extracted to the display-surface side is incident on the optical sheet 91 on the display surface-side after being transmitted sequentially through the prism 86 and the light guide plate 60. Therefore, it is necessary to determine the width of the prism 80, the number of prisms 80, and the density of the light black pigment embedded in the prism 80, such that the front transmittance of the light guide plates 60 and 61 is 95 to 99%. Moreover, to render it easy to embed the black pigment in the prism 80, the prism 80 is preferably in the shape of a groove, such as a V-like groove or a trapezoidal groove.

Furthermore, as the prism 86 in which the black pigment is embedded, a portion of each prism 80 formed across the B-planes of the light guide plates 60 and 61 is used, and therefore, the process of producing the light guide plates 60 and 61 can be shortened. Thus, the cost of producing the light guide plates 60 and 61 can be reduced.

<4.3 Effects>

In the present embodiment, the front transmittance of the black pigment embedded in the prism 86 is 95 to 99%, and therefore, the light that is not extracted from the first section repeatedly strikes on the prisms 86 in the second section, with the result that much of the light is absorbed in the second section. Accordingly, the light from the LEDs 65c that is not extracted from the first section is barely extracted by means of the light extraction pattern 81 provided in the third section, from which light from the LEDs 65d should originally be extracted, and therefore, image contrast can be prevented from being reduced due to stray light. Moreover, the front transmittance of the light guide plates 60 and 61 is as high as 95 to 99%, and therefore, light that is transmitted through the light guide plates 60 and 61 with the prisms 86 to the display-surface side is barely influenced by the prisms 86. Thus, even if light emitted by the LEDs 65c and 65d is transmitted through the light guide plate 60 or 61 with the slits 84, the light can be kept from being significantly reduced in luminance.

Furthermore, since the prism 86, which is a portion of the prism 80 and has the black pigment embedded therein, is used as the light absorbing groove, the process of producing the light guide plates 60 and 61 can be shortened. Thus, the cost of producing the light guide plates 60 and 61 can be reduced.

<4.4 Variants>

Figure 29:
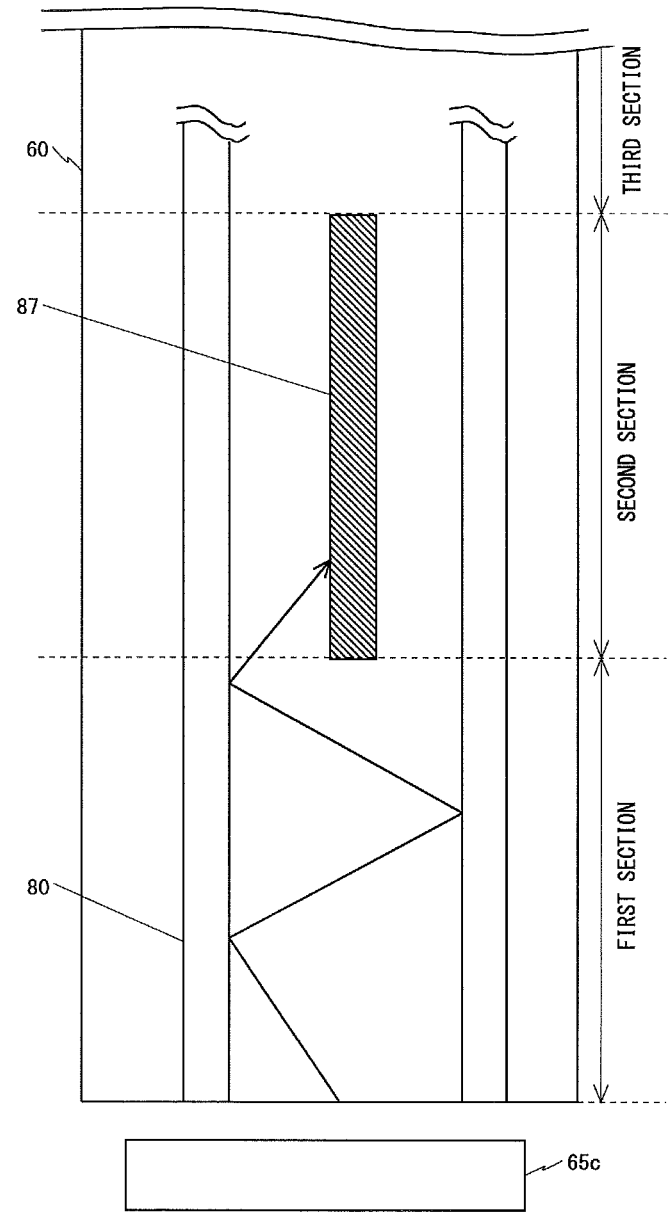
FIG. 29 is a diagram illustrating a path along which light emitted by an LED 65c travels from the first section toward the third section while hitting prisms 80 formed across the light guide plate 60 in the variant of the fourth embodiment of the present invention.

In the embodiment, by embedding a black pigment in a portion of each prism 86 formed in the B-planes of the light guide plates 60 and 61, the prism 80 can not only function to allow incident light to travel straight but also function as the light absorbing groove. However, the light absorbing groove may be formed independently of the prism 80. FIG. 28 provides plan views and cross-sectional views illustrating the configuration of a backlight unit according to the present variant; more specifically, FIG. 28(A) provides a plan view and a cross-sectional view of the light guide plate 60, and FIG. 28(B) provides a plan view and a cross-sectional view of the light guide plate 61. As shown in FIGS. 28(A) and 28(B), in the present variant, light absorbing grooves 87 are formed independently of and parallel to the prisms 80, so as to be positioned between the prisms 80 in the second section of the light guide plate 60 and also between the prisms 80 in the third section of the light guide plate 61. The light absorbing grooves 87 preferably absorb much of incident light, and since the light absorbing grooves 87 are formed independently of the prisms 80, similar to the case of the second embodiment, it is preferable to embed a black pigment having an absorbance of 90 to 100% in the light absorbing grooves 87. FIG. 29 is a diagram illustrating a path along which light emitted by the LED 65c travels from the first section toward the third section while hitting the prisms 80 formed across the light guide plate 60. As shown in FIG. 29, the light emitted by the LED 65c travels through the first section with the light extraction pattern 81 to the second section, where the light continues to travel toward the third section while being repeatedly reflected by the prisms 80. In this manner, while traveling through the second section, the light is almost certainly absorbed by the light absorbing groove 87 if the light strikes on the the light absorbing groove 87 even once. As a result, when compared to the light that travels from the first section to the second section, significantly less light travels through the second section to the third section. Thus, less light is extracted from the third section as stray light, so that image contrast can be inhibited from being reduced. The same also applies to light that travels through the third section with the light absorbing grooves 87 in the light guide plate 61.

Furthermore, similar to the case of the fourth embodiment, the width of the light absorbing groove 87 and the number of light absorbing grooves 87 are adjusted such that the front transmittance of the light guide plates 60 and 61 is 95 to 99%. Thus, even if light emitted by the LEDs 65c is transmitted through the light guide plate 60 or 61 with the light absorbing grooves 87, the light can be kept from being significantly reduced in luminance.

Furthermore, the black pigment having an absorbance of 90 to 100% may be applied to side surfaces of the light absorbing grooves 87, instead of embedding the black pigment in the light absorbing grooves. In this case also, effects similar to those achieved in the case where the black pigment is embedded in the light absorbing grooves 87 can be achieved.

5. Variant Common Among all Embodiments

Figure 30:
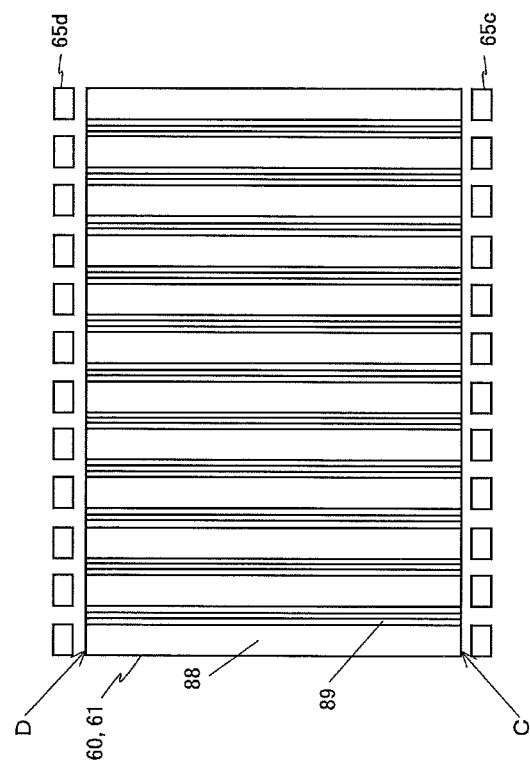
FIG. 30 is a diagram illustrating a variant of the light guide plate that can be used in each of the first through fourth embodiments.

In each of the embodiments, the prisms 80 are formed entirely across the B-planes of the light guide plates 60 and 61 included in the backlight unit in order to allow incident light to travel straight without deviating to the left and right. However, instead of using such light guide plates 60 and 61, light guide plates 60 and 61 with prism areas 89, each of which consists of a plurality of prisms and by which each of the light guide plates 60 and 61 is divided into a plurality of subareas 88, may be used. FIG. 30 is a diagram illustrating the configuration of the light guide plates 60 and 61 provided with the prism areas 89, each consisting of a plurality of prisms, between borders of the subareas 88. The light guide plates 60 and 61 shown in FIG. 30 have a high confinement effect for each subarea 88, and therefore, much of the light emitted by one LED 65c exits a subarea 88 corresponding to that LED 65c. Accordingly, effects similar to those achieved in the case where the light guide plates 60 and 61 described in each embodiment of the present invention can also be achieved by using the light guide plates 60 and 61 shown in FIG. 30 instead.

This application claims priority to Japanese Patent Application No. 2016-182775, filed Sep. 20, 2016 and titled "SURFACE LIGHT SOURCE DEVICE AND LIQUID CRYSTAL DISPLAY DEVICE", the content of which is incorporated by reference herein.

DESCRIPTION OF THE REFERENCE CHARACTERS 10 liquid crystal display device
20 liquid crystal panel
50 light source lighting circuit (light emitter lighting circuit)
60 light guide plate (first light guide plate)
61 light guide plate (second light guide plate)
65 light source
65c LED (first light emitter)
65d LED (second light emitter)
70 backlight unit
80 prism
81 light extraction pattern
82 light absorbing layer
83 black pattern element
84 slit
85 trapezoidal groove
86 prism (light absorbing groove)
87 light absorbing groove

The invention claimed is:

1. A surface light source device comprising: a plurality of stacked light guide plates, each having a pair of principal planes opposite to each other; and a plurality of first light emitters and a plurality of second light emitters, the first and second light emitters being disposed on respective pairs of opposite side surfaces of the light guide plates, wherein, each of the light guide plates is divided into a plurality of sections in a direction from a first side surface to a second side surface, the sections being parallel to the side surfaces, two nonadjacent sections of the sections provided for each of the light guide plates are light emission sections, each having light extraction patterns formed for reflecting incident light from the first or second light emitters so as to exit the light guide plate, the light emission sections of the light guide plates are disposed so as not to overlap one another in a stacking direction, and the light guide plates have light absorbers provided in sections of the plurality of section that are adjacent and between two consecutive ones of the light emission sections, the light absorbers absorbing light emitted by the first and second light emitters.

2. The surface light source device according to claim 1, wherein,
the light guide plates include a stack of first and second light guide plates,
each of the first and second light guide plates includes four sections divided in a direction from the first side surface to the second side surface such that of the four sections of each of the first and second light guide plates, two nonadjacent sections are the light emission sections disposed so as not to overlap the light emission sections of the other light guide plate in the stacking direction, and
the light absorbers provided in the sections between the light emission sections of the light guide plates include a black pigment absorbing light emitted by the first and second light emitters.

3. The surface light source device according to claim 2, wherein the light guide plate has a plurality of prisms formed across the first principal plane so as to extend from the first side surface to the second side surface.

4. The surface light source device according to claim 3, wherein the light absorber includes a plurality of light absorbing grooves extending in a direction perpendicular to the prisms formed across the light guide plate, each light absorbing groove containing the black pigment.

5. The surface light source device according to claim 4, wherein
the black pigment contained in the light absorbing groove has an absorbance of 90 to 100%, and
the light guide plate with the light absorbing grooves has a front transmittance of 95 to 99%.

6. The surface light source device according to claim 4, wherein the black pigment is embedded in the light absorbing groove.

7. The surface light source device according to claim 4, wherein the black pigment is applied to side surfaces of the light absorbing groove.

8. The surface light source device according to claim 4, wherein the light absorbing groove is a slit-like groove or a trapezoidal groove.

9. The surface light source device according to claim 3, wherein the light absorber includes a portion of each of the prisms formed across a surface of the light guide plate, the portion being provided in a section between the light emission sections and containing the black pigment.

10. The surface light source device according to claim 9, wherein the light guide plate with the prisms containing the black pigment has a front transmittance of 95 to 99%.

11. The surface light source device according to claim 3, wherein the light absorber includes light absorbing grooves formed between and directed parallel to the prisms formed across the light guide plate, the light absorbing grooves containing the black pigment.

12. The surface light source device according to claim 2, wherein the light absorber includes a plurality of black pattern elements formed of a black pigment and absorbing some incident light.

13. The surface light source device according to claim 12, wherein the black pigment has an absorbance of 90 to 100%, and the light guide plate with the black pattern elements has a front transmittance of 95 to 99%.

14. The surface light source device according to claim 12, wherein the black pattern element has a maximum outer diameter of 0.1 mm or less.

15. The surface light source device according to claim 2, wherein the light absorber is a thin-film light absorbing layer including a black pigment and absorbing some incident light.

16. The surface light source device according to claim 15, wherein the light absorbing layer is a thin film having a front transmittance of 95 to 99%.

17. The surface light source device according to claim 2, wherein the light absorber is provided on at least one principal plane of each of the first and second light guide plates.

18. The surface light source device according to claim 2, wherein the light guide plate is divided into a plurality of subareas by prism areas, each prism area consisting of a plurality of prisms extending across the first principal plain from the first side surface to the second side surface.

19. The surface light source device according to claim 2, wherein the light extraction pattern is formed in the light emission section so as to monotonically increase in density from a side of the closer of the first and second light emitters toward a center portion.

20. The surface light source device according to claim 2, further comprising a light emitter lighting circuit configured to allow the first light emitters and the second light emitters to emit light with luminances obtained based on externally provided luminance data, wherein the first light emitters and the second light emitters are connected in parallel and to the light emitter lighting circuit.

21. A liquid crystal display device comprising a surface light source device of claim 1.

\* \* \* \* \*